United States Patent [19]

Imakawa et al.

[11] Patent Number: 4,962,431
[45] Date of Patent: Oct. 9, 1990

[54] SYNCHRONIZING SIGNAL GENERATING SYSTEM FOR LASER SCANNER

[75] Inventors: Susumu Imakawa, Yokohama; Yoshinobu Takeyama, Kawasaki; Nobuaki Kubo, Urawa; Masanori Saitoh, Tokyo, all of Japan

[73] Assignee: Ricoh Company, Ltd., Tokyo, Japan

[21] Appl. No.: 311,778

[22] Filed: Feb. 17, 1989

Related U.S. Application Data

[63] Continuation-in-part of Ser. No. 190,069, May 4, 1988, Pat. No. 4,837,588.

[30] Foreign Application Priority Data

| May 8, 1987 | [JP] | Japan | 62-112035 |
| May 8, 1987 | [JP] | Japan | 62-112034 |
| Oct. 9, 1987 | [JP] | Japan | 62-155325 |
| Oct. 13, 1987 | [JP] | Japan | 62-257949 |
| Dec. 4, 1987 | [JP] | Japan | 62-307117 |
| Dec. 4, 1987 | [JP] | Japan | 62-307118 |
| Apr. 5, 1988 | [JP] | Japan | 63-83871 |
| May 6, 1988 | [JP] | Japan | 63-109952 |
| May 6, 1988 | [JP] | Japan | 63-109948 |

[51] Int. Cl.⁵ .............. H04N 1/04; H04N 1/23; G01D 15/14
[52] U.S. Cl. ............. 358/296; 346/108; 346/160; 358/481; 358/494
[58] Field of Search ........... 346/108, 107 R, 76 L, 346/110 R, 160; 358/296, 300, 302, 409, 481, 486, 494; 250/235, 234, 237 G, 227; 355/1; 350/96.18, 96.19

[56] References Cited

U.S. PATENT DOCUMENTS

| 3,389,403 | 6/1968 | Cottingham et al. | 346/108 |
| 3,999,010 | 12/1976 | Oosaka | 358/302 |
| 4,212,018 | 7/1980 | Ohnishi et al. | 346/108 |
| 4,293,202 | 10/1981 | Ohnishi | 346/108 |
| 4,306,242 | 12/1981 | Jeffery | 346/108 |
| 4,358,793 | 11/1982 | Hosaka | 358/300 |
| 4,408,826 | 10/1983 | Ike | 250/236 |
| 4,429,220 | 1/1984 | Noguchi | 250/236 |
| 4,616,132 | 10/1986 | Kessler | 250/236 |
| 4,661,699 | 4/1987 | Welmers | 358/494 |
| 4,691,241 | 9/1987 | Tomohisa | 358/409 |
| 4,739,162 | 4/1988 | Ortiz | 250/227 |
| 4,806,753 | 2/1989 | Noguchi | 250/235 |

FOREIGN PATENT DOCUMENTS

| 72473 | 4/1985 | Japan. |
| 75168 | 4/1985 | Japan. |
| 124938 | 7/1985 | Japan. |

Primary Examiner—Bruce A. Reynolds
Assistant Examiner—Scott A. Rogers
Attorney, Agent, or Firm—Oblon, Spivak, McClelland, Maier & Neustadt

[57] ABSTRACT

A synchronizing signal generating system for a laser scanner includes a source for emitting a first laser beam for scanning and a second laser beam for synchronization of scans by the first laser beam, a polygonal mirror for causing the first laser beam to scan a medium and for causing the second laser beam to scan a grating which has bright portions and dark portions alternately arranged along a scanning direction of the second laser beam, a converging optical system for converging the second laser beam transmitted through the grating, a light receiving system for receiving the second laser beam converged by the converting optical system and for generating a synchronizing signal and a circuit for controlling the source responsive to the synchronizing signal so as to synchronize a scan timing of the first laser beam. A scan length of the second laser beam measured on the grating is set longer than a scan length of the first laser beam measured on the same plane.

6 Claims, 26 Drawing Sheets

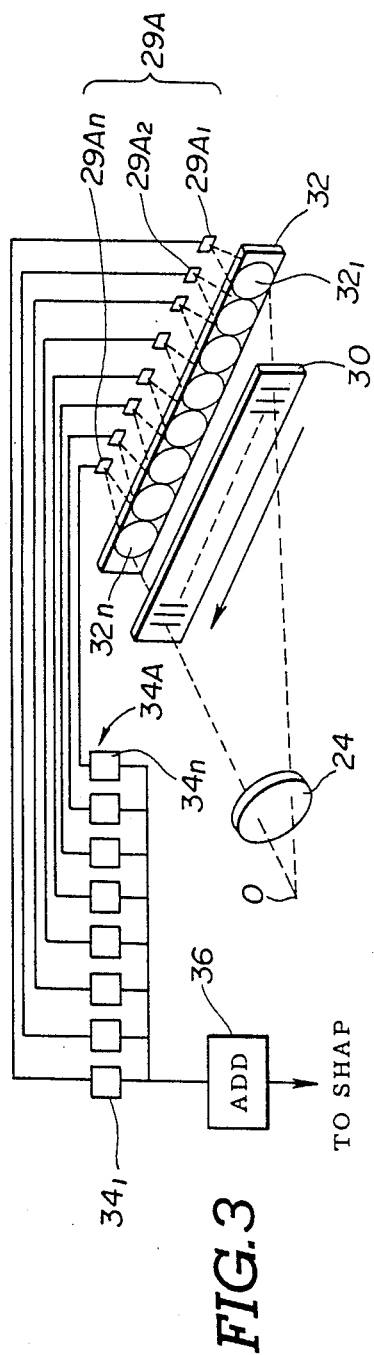
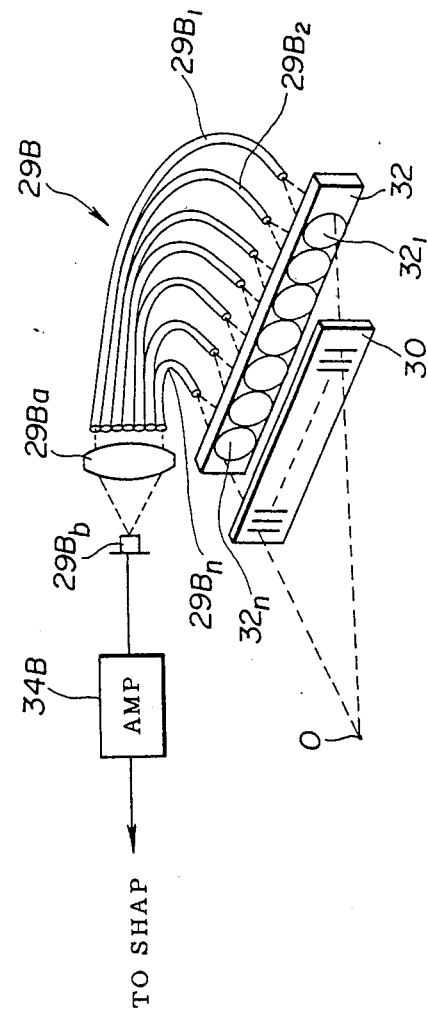

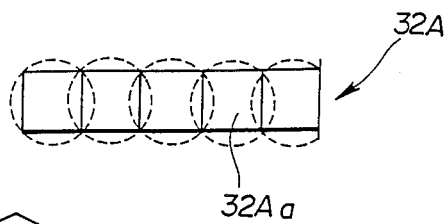
FIG. 7A
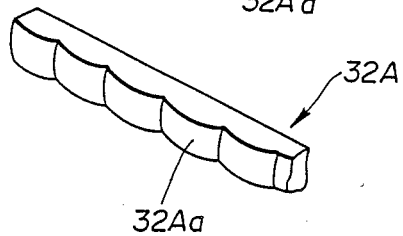
FIG. 7B
FIG. 8
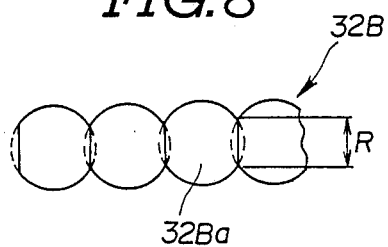
FIG. 9
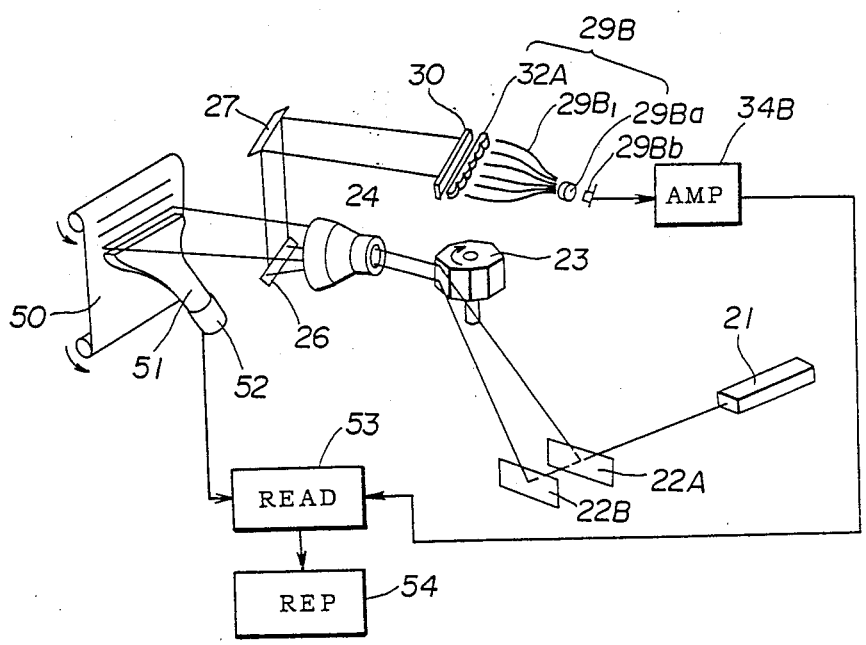

FIG.20
FIG.21
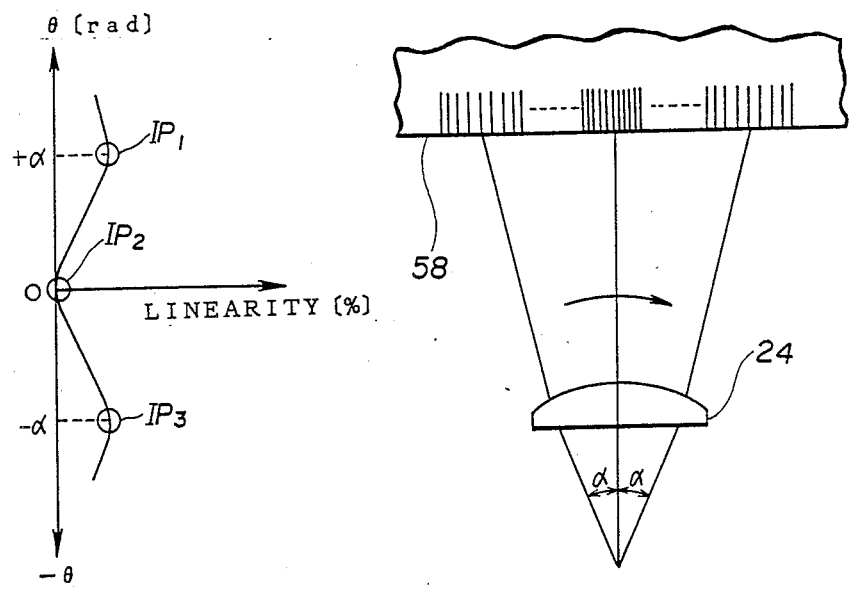
FIG.22
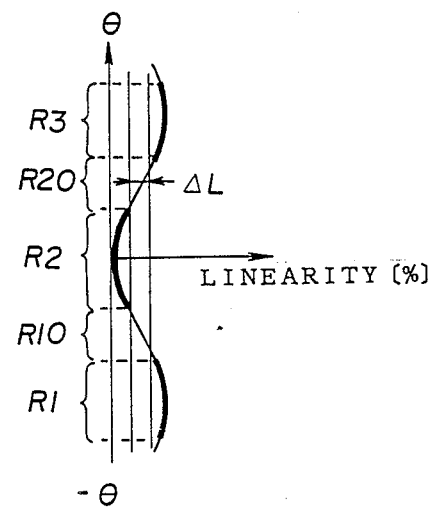

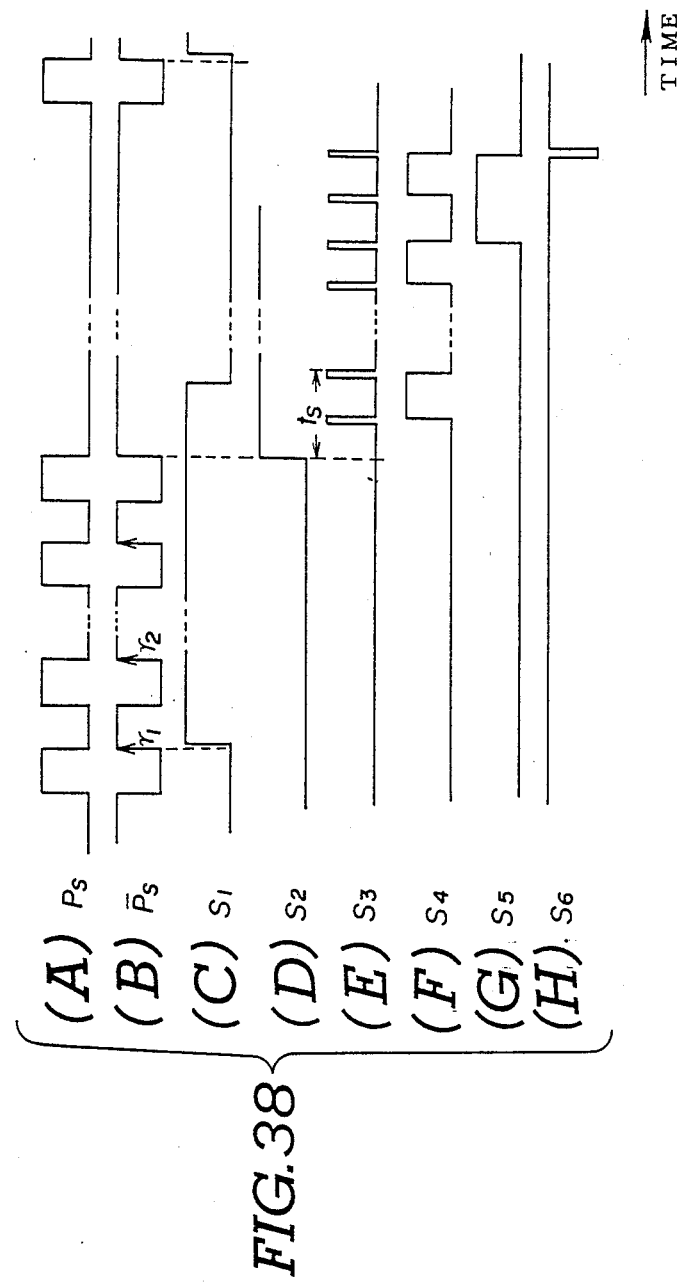

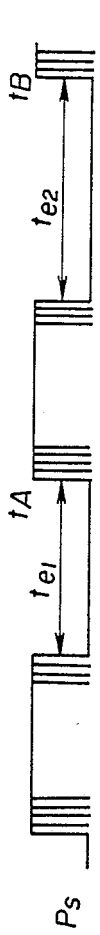
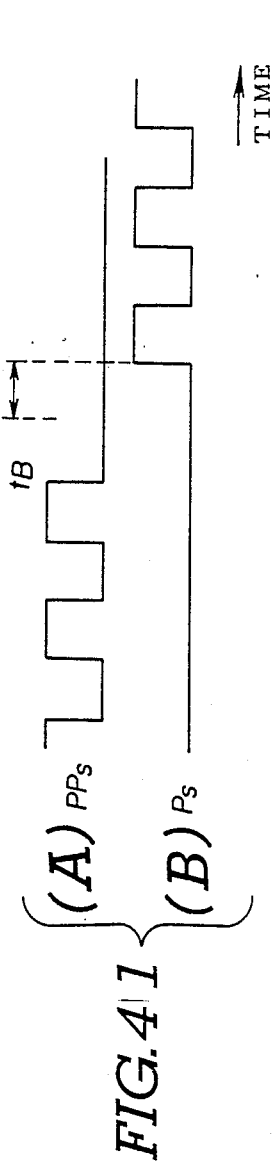
FIG.39
FIG.40
FIG.41

(A) D
(B) Ps
(C) CLK

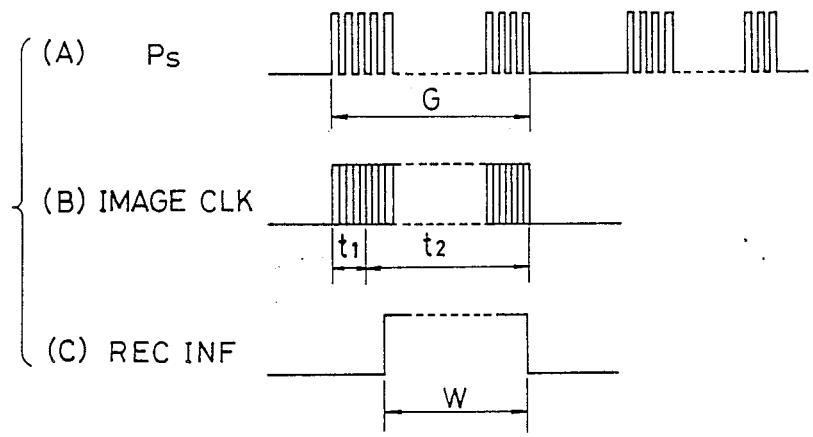
FIG.50
FIG.51
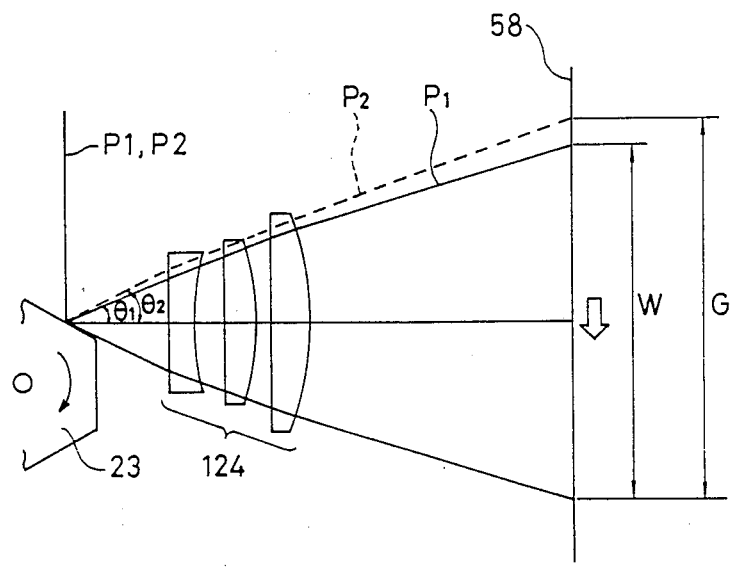

SYNCHRONIZING SIGNAL GENERATING SYSTEM FOR LASER SCANNER

BACKGROUND OF THE INVENTION

The present application is a continuation-in-part Application of the U.S. Pat. application Ser. No. 190,069 filed May 4, 1988, now U.S. Pat. No. 4,837,588 issued Jun. 6, 1989.

The present invention generally relates to synchronizing signal generating systems, and more particularly to a synchronizing signal generating system for a laser scanner.

A laser scanner uses a laser beam to write (record) and/or read information on and/or from a recording medium. Generally, the laser scanner is provided with a deflector such as a polygonal mirror (or polygonal scanner) for deflecting a laser beam which is to scan the recording medium. However, it is virtually impossible to keep the scan timing constant for each scan because the rotation of the deflector cannot be maintained perfectly constant and mirror surfaces of the deflector cannot be finished to perfect mirror surfaces. For this reason, a synchronizing signal is required to control the scan timing to an optimum timing.

Conventionally, prior to each scan by the laser beam, the scan is synchronized by detecting the laser beam immediately prior to the scan. However, such a synchronization which simply detects the laser beam at one point prior to each scan is insufficient, because the scanning speed is not perfectly constant due to a deviation in the rotational speed of the deflector, a deviation of the characteristic of a $f\theta$-lens from an ideal linear characteristic and the like.

Accordingly, methods of more accurately synchronizing the scan were proposed in Japanese Laid-Open Patent Applications No. 54-97050 and No. 60-124938. These methods use a laser beam for recording and another laser beam for scan synchronization.

FIG. 1 shows an essential part of a recording apparatus employing a laser scanner in which the synchronizing signal is basically generated according to such proposed methods. The recording apparatus comprises a laser diode 1 for emitting a laser beam for recording (hereinafter referred to as a recording beam, a laser diode 2 for emitting a laser beam which is used for generating a synchronizing clock signal (hereinafter referred to as a synchronizing beam), a polygonal mirror 3, an $f\theta$-lens 4, mirrors 6 and 7, a concave mirror 8, a light receiving element 9 such as a photodetector, a grating 10, an amplifier 11, a shaping circuit 13, a laser diode driver 15, and an information source 17.

The laser beams emitted from the laser diodes 1 and 2 are deflected by the polygonal mirror 3 and is transmitted through the $f\theta$-lens 4, so that the recording beam scans a recording medium 5 such as a photosensitive sheet or drum to record an information and the synchronizing beam scans the grating 10 by way of the mirrors 6 and 7.

As shown in FIG. 2, the grating 10 comprises minute bright portions 10a and minute dark portions 10b which occur alternately with a predetermined pitch. When the synchronizing beam scans the grating 10 and a beam spot SP of the synchronizing beam moves in a direction A, the intensity of the synchronizing beam transmitted through the grating 10 becomes modulated depending on the arrangement of the bright and dark portions 10a and 10b. The synchronizing beam transmitted through the grating 10 is converged by the concave mirror 8 and is directed to the light receiving element 9 where it is subjected to a photoelectric conversion. The light receiving element 9 outputs a pulse signal which is passed through the amplifier 11 and the shaping circuit 13, and an output pulse signal of the shaping circuit 13 is supplied to the laser diode driver 15 as a synchronizing clock signal. The laser diode driver 15 produces an image clock signal which has a frequency higher than that of the incoming synchronizing clock signal and is synchronized to the synchronizing clock signal, and drives the laser diode 1 in synchronism with the image clock signal depending on information data entered from the information source 17. Since the synchronizing clock signal is generated based on the synchronizing beam, the driving timing of the laser diode 1 is automatically adjusted even when the rotational speed of the polygonal mirror 3 becomes unstable during the recording operation. Therefore, the recording operation is carried out with an appropriate scan timing.

The grating 10 itself is known, and is sometimes referred to as a slit or grid scale. The slit scale comprises a light transmitting portion and a non-transmitting portion which occur alternately with a predetermined pitch.

The problem of the conventional methods of generating the synchronizing signal is in that the synchronizing beam transmitted through the grating 10 is converged and directed to the single light receiving element 9 by use of the concave mirror 8. In other words, when the scanning distance (width) per scan becomes long, it becomes necessary to use a large concave mirror, but such a large concave mirror cannot converge the synchronizing beam satisfactorily to a small beam spot on the light receiving element 9 due to aberration and errors introduced during the production of the concave mirror. As a result, it becomes extremely difficult to generate the synchronizing clock signal with a high accuracy when such a large concave mirror is used.

The use of a mirror array is proposed in a Japanese Laid-Open Patent Application No. 60-72473 as a method of eliminating some of the problems described before. According to this method, the synchronizing beam transmitted through the grating is converged and directed to a plurality of light receiving elements by a plurality of concave mirrors constituting the mirror array. However, a vapor deposition process is needed to produce such a mirror array, and the production cost of the mirror array is high. In addition, since the plurality of light receiving elements are located in an optical path between the grating and the mirror array, the mirror array must be arranged obliquely, that is, optical axes of the plurality of concave mirrors of the mirror array must lie on a plane oblique to an optical axis of an $f\theta$-lens through which the beam reaches the grating, so as to avoid interference of the beam directed to the mirror array and the beam directed to each of the plurality of light receiving elements, and the positioning of the mirror array is difficult and troublesome to perform.

In addition, scattering of the reflected light occurs at each boundary portion between two mutually adjacent concave mirrors of the mirror array, and there is a decrease in the quantity of light reaching the light receiving element from the boundary portion. As a result, the output of the light receiving element deviates and the synchronizing clock signal becomes unstable, thereby making it impossible to carry out an accurate synchronous detection. In order to ensure the generation of a stable and accurate synchronizing clock signal, it is essential to provide a compensation circuit to compensate for the output deviation of the light receiving element caused by the scattering of the reflected light at the boundary portion, but the use of such a compensation circuit makes the construction of the laser scanner complex.

In other words, the duty cycle of the synchronizing clock signal becomes unstable at the boundary portion between the two mutually adjacent concave mirrors of the mirror array. In extreme cases, a signal dropout occurs at the boundary portion. Usually, a phase locked loop (PLL) circuit is used to match the phase of the image clock signal with that of the synchronizing clock signal. The image clock signal is used to enable and disable the recording operation. The PLL circuit comprises a phase comparator for comparing the phases of the synchronizing clock signal from the shaping circuit and an output signal of a voltage controlled oscillator (VCO) which is controlled by an output control voltage of the phase comparator, and the output signal of the VCO is used as the image clock signal.

For this reason, the unstable duty cycle of the synchronizing clock signal and the signal dropout in the synchronizing clock signal cause the PLL circuit to run from the locked state and cause a sudden change in the oscillation frequency of the VCO. In these cases, the image clock signal becomes unstable and deteriorates the quality of the recording made on the recording medium. In terms of the frequency, the change in the duty cycle of the synchronizing clock signal causes a voltage change in the output control voltage of the phase comparator, and this change in the control voltage causes a frequency change in the image clock signal. The change in the frequency of the image clock signal appears as moire and the like on the recording medium and greatly deteriorates the quality of the recording.

On the other hand, a Japanese Laid-Open Patent Application No. 60-75168 discloses a method of eliminating the undesirable effects of the scattering of the reflected light at the boundary portion. This method uses two mirror arrays which are essentially positioned one on top of the other. A first mirror array is made up of concave mirrors having boundary portions which do not coincide with boundary portions of concave mirrors constituting a second mirror array. A first group of light receiving elements are provided to receive reflected lights from the first mirror array, and a second group of light receiving elements are provided to receive reflected lights from the second mirror array. The synchronizing clock signal is derived by adding outputs of the light receiving elements in the first and second groups. However, this method requires a complex converging optical system, and furthermore, a light receiving system for receiving the converged light from the converging optical system also becomes complex due to the large number of light receiving elements used.

SUMMARY OF THE INVENTION

Accordingly, it is a general object of the present invention to provide a novel and useful synchronizing signal generating system for a laser scanner, in which the problems described heretofore are eliminated.

Another and more specific object of the present invention is to provide a synchronizing signal generating system for a laser scanner, comprising first means for emitting a first laser beam for scanning and a second laser beam for synchronization of scans by the first laser beam; second means for scanning a medium by the first laser beam; third means for scanning a grating by the second laser beam, the grating having bright portions and dark portions alternately arranged along a scanning direction of the second laser beam; a converging optical system for converging the second laser beam transmitted through the grating; a light receiving system for receiving the second laser beam converged by the converting optical system and for generating a synchronizing signal; and fourth means for controlling the first means responsive to the synchronizing signal so as to synchronize a scan timing of the first laser beam. A scan length of the second laser beam measured on the grating is set longer than a scan length of the first laser beam measured on the same plane. According to the synchronizing signal generating system for the present invention, it becomes possible to define the scan timing of the first laser beam so as to record information on the recording medium in a stable recording state.

Other objects and further features of the present invention will be apparent from the following detailed description when read in conjunction with the accompanying drawings.

BRIEF DESCRIPTION OF THE DRAWINGS

FIG. 3 generally shows an essential part of a first embodiment of the synchronizing signal generating system according to the present invention applied to the recording apparatus;

FIG. 4 generally shows an essential part of a second embodiment of the synchronizing signal generating system according to the present invention applied to the recording apparatus;

FIGS. 7A and 7B are a front view and a perspective view respectively showing a part of a first modification of the lens array;

FIG. 8 is a front view showing a part of a second modification of the lens array;

FIG. 9 generally shows an essential part of a fourth embodiment of the synchronizing signal generating system according to the present invention applied to the document reading apparatus;

FIG. 20 shows the linearity characteristic of the scanning position of the synchronizing beam transmitted through the $f\theta$-lens with respect to the synchronizing beam angle $\theta$;

FIG. 21 is a diagram for explaining the which is introduced when dots are recorded on the recording medium;

FIG. 22 is a diagram for explaining ranges in which convex lenses are arranged in the ninth embodiment;

FIGS. 35(A) and 35(B) and FIGS. 36(A) and 36 (B) respectively are timing charts for explaining the relationship between the synchronizing clock signal and the pseudo synchronizing clock signal;

FIGS. 38(A) through 38(H) are timing charts for explaining the operation of the electrical system shown in FIG. 37;

FIG. 39 shows the synchronizing clock signal for explaining a change in the duration of the non-image region due to an error in an angular separation of two mutually adjacent mirror surfaces of the polygonal mirror;

FIGS. 40(A) and 40(B) and FIGS. 41(A) and 41(B) are timing charts for explaining the phase shift between the synchronizing clock signal and the pseudo synchronizing clock signal;

FIGS. 50(A) through 50(C) are timing charts for explaining operation of a still further embodiment of the present invention;

FIG. 51 is a view illustrating the principle of the still further embodiment.

DETAILED DESCRIPTION

Figure 1:
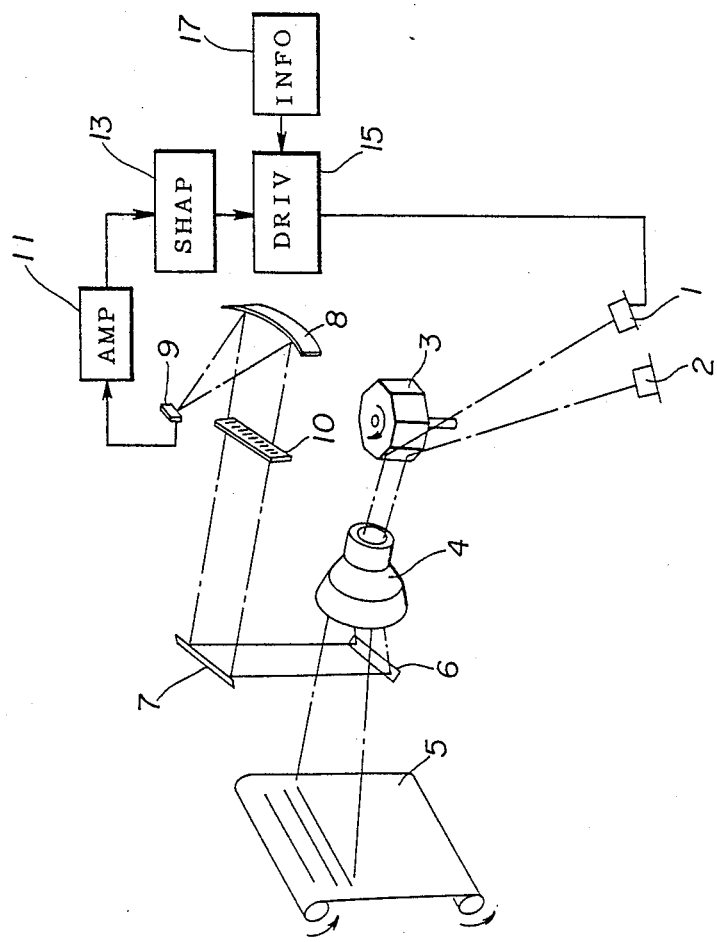
FIG. 1 generally shows an essential part of a recording apparatus employing a laser scanner in which the synchronizing signal is basically generated according to the conventional method.

FIG. 3 shows an essential part of a first embodiment of the synchronizing signal generating system according to the present invention applied to the recording apparatus. In FIG. 3, the illustration and description of those parts of the recording apparatus which are essentially the same as those of the recording apparatus shown in FIG. 1 will be omitted.

Figure 2:
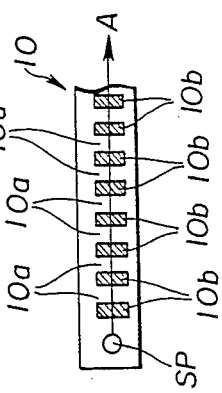
FIG. 2 is a front view showing an essential part of a grating used in the recording apparatus shown in FIG. 1.

In FIG. 3, O denotes a point of deflection of the synchronizing beam on a mirror surface of the polygonal mirror (not shown). An optical path from the point O to a grating 30 is identical to that of FIG. 1. The grating 10 shown in FIG. 2 may be used as the grating 30. For example, the bright and dark portions of the grating 30 are provided with a pitch which is an integral multiple of the recording density.

A lens array 32 comprises n lenses $32_1$ through $32_n$ for independently converging the synchronizing beam transmitted through the grating 30. The lenses $32_1$ through $32_n$ are arranged side by side along a scanning direction of the synchronizing beam for the full width of the scan. The lens array 32 constitutes a converging optical system. A light receiving system 29A located on the rear of the lens array 32 comprises n light receiving elements $29A_1$ through $29A_n$ which are also arranged along the scanning direction. These light receiving elements $29A_1$ through $29A_n$ are arranged in correspondence with the lenses $32_1$ through $32_n$ of the lens array 32.

The lens array 32 may be made of glass lenses or injection molded from an optical plastic. The lens array 32 may also be constituted by holographic lenses. When plastic lenses or holographic lenses are used for the lens array 32, the cost of the converging optical system can be kept down to a very low cost.

When the synchronizing beam transmitted through the grating 30 reaches the lens of the lens array 32, this lens converges and directs the synchronizing beam to a corresponding light receiving element of the light receiving system 29A. In other words, the synchronizing beam received through the grating 30 is divided by the lens array 32 and the divided beams are received by the corresponding light receiving elements $29A_1$ through $29A_n$ of the light receiving system 29A.

Outputs of the light receiving elements $29A_1$ through $29A_n$ are amplified in corresponding amplifiers $34_1$ through $34_n$ of an amplifier part 34A and are added in an adder 36. An output pulse signal of the adder 36 is dependent on the arrangement of the bright and dark portions of the grating 30, and this output pulse signal is supplied to the shaping circuit (not shown). The output of the shaping circuit is applied to the laser diode driver (not shown) as a synchronizing clock signal so as to control the recording timing (that is, scan timing) and an image clock signal is produced based on this synchronizing clock signal as in the case of the conventional recording apparatus shown in FIG. 1 described before.

FIG. 4 shows an essential part of a second embodiment of the synchronizing signal generating system according to the present invention applied to the recording apparatus. In FIG. 4, those parts which are essentially the same as those corresponding parts in FIG. 3 are designated by the same reference numerals, and a description thereof will be omitted.

In FIG. 4, a light receiving system 29B comprises optical fibers $29B_1$ through $29B_n$, a lens $29B_a$ and a light receiving element $29B_b$. Receiving ends of these optical fibers $29B_1$ through $29B_n$ are arranged along the scanning direction in correspondence with the n lenses $32_1$ through $32_n$ of the lens array 32. On the other hand, emitting ends of the optical fibers $29B_1$ through $29B_n$ are bundled and confront the lens $29B_a$. Hence, the lights emitted from the emitting ends of the optical fibers $29B_1$ through $29B_n$ are converged by the lens $29B_a$ onto the light receiving element $29B_b$. An output of the light receiving element $29B_b$ is amplified by an amplifier 34B and is supplied to the shaping circuit (not shown).

According to the second embodiment, the number of light receiving elements and amplifiers may be reduced compared to the first embodiment.

In the first and second embodiments, the laser diodes are used as the light source. However, it is of course possible to use a gas laser as the light source. But the gas laser cannot carry out a direct modulation, and in this case, it is necessary to use an external modulator such as an acoustic optical modulator (AOM). The generated synchronizing clock signal is applied to an AOM driver which drives the AOM.

Figure 5:
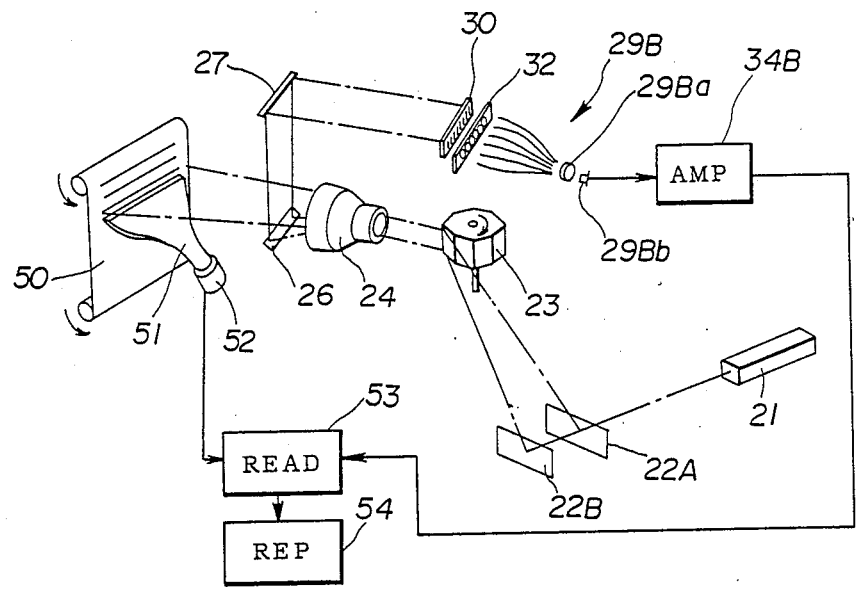
FIG. 5 generally shows an essential part of a third embodiment of the synchronizing signal generating system according to the present invention applied to a document reading apparatus.

FIG. 5 shows an essential part of a third embodiment of the synchronizing signal generating system according to the present invention applied to a document reading apparatus. In FIG. 5, those parts which are essentially the same as those corresponding parts in FIG. 4 are designated by the same reference numerals, and a description thereof will be omitted. In this third embodiment, a single gas laser source 21 is used as the light source.

In FIG. 5, a laser beam from the gas laser source 21 is divided into a laser beam for reading (hereinafter referred to as a reading beam) and a synchronizing beam by a semitransparent mirror 22A. The reading beam is reflected by the semitransparent mirror 22A while the synchronizing beam is transmitted through the semitransparent mirror 22A. The reading beam is deflected by the polygonal mirror 23 and scans a document 50 through the $f\theta$-lens 24. The reading beam reflected from the document 50 is received by a bundle of optical fibers 51. The reading beam received by the optical fibers 51 is converted into an image signal by a photoelectric conversion carried out in a light receiving element 52.

On the other hand, the synchronizing beam is reflected by a mirror 22B and is deflected by the polygonal mirror 23. The deflected synchronizing beam passes through the the $f\theta$-lens 24 and is reflected by the mirrors 26 and 27 so as to scan the grating 30. The synchronizing beam transmitted through the grating 30 is received by the light receiving system 29B where it is subjected to the photoelectric conversion. The pulse signal outputted from the light receiving system 29B is amplified in the amplifier 34B and is applied to a reading circuit 53 as the synchronizing clock signal. The reading circuit 53 is also supplied with the image signal from the light receiving element 52, and the reading circuit 53 can detect the scanning position of the reading beam on the document 50 by counting pulses of the image clock signal which is generated based on the synchronizing clock signal. The image signal received by the reading circuit 53 is supplied to an image reproducing circuit 54 which reproduces the image on the document 50 which is scanned.

Figure 6A:
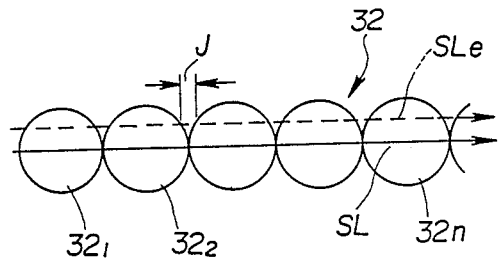
FIG. 6A is a front view showing a part of the lens array used in the first through third embodiments.

In the first through third embodiments described heretofore, the lenses $32_1$ through $32_n$ of the lens array 32 have the same circular shape and the peripheral portions of two mutually adjacent lenses touch each other as shown in FIG. 6A. When the lens array 32 is correctly positioned, the synchronizing beam scans along a scanning line SL indicated by a solid line in FIG. 6A. This scanning line SL passes centers of each of the lenses $32_1$ through $32_n$. But when there is a positioning error of the lens array 32, the synchronizing beam scans along a scanning line SLe indicated by a phantom line in FIG. 6A, for example. As shown, the scanning line SLe is deviated from the scanning line SL, that is, deviated from the correct scanning position, and does not pass the centers of the lenses $32_1$ through $32_n$.

Figure 6B:
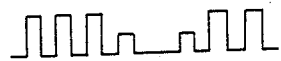
FIG. 6B shows a synchronizing clock signal in correspondence with FIG. 6A for explaining a signal dropout in the synchronizing clock signal.

When the synchronizing beam scans along the scanning line SLe, the synchronizing beam does not reach the light receiving system at joint portions between the two mutually adjacent lenses of the lens array 32 because of the gap formed at the joint portion. An example of the gap formed at the joint portion is indicated by J in FIG. 6A. As a result, a signal dropout occurs in the synchronizing clock signal at the joint portions as shown in FIG. 6B.

Next, a description will be given on modifications of the lens array 32 applicable to each of the first through third embodiments for eliminating the signal dropout in the synchronizing clock signal.

FIGS. 7A and 7B show a part of a first modification of the lens array 32. A lens array 32A comprises cylindrical lenses 32Aa which are arranged side by side in a line. Each cylindrical lens 32Aa corresponds to a central rectangular portion of a circular lens indicated by a phantom line in FIG. 7A. Accordingly even when the synchronizing beam scans along a scanning line deviated from the correct scanning position, no signal dropout will occur in the synchronizing clock signal because there is no gap at the joint portion between two mutually adjacent cylindrical lenses 32Aa.

FIG. 8 shows a part of a second modification of the lens array 32. A lens array 32B comprises lenses 32Ba which are arranged side by side in a line. Each lens 32Ba corresponds to a central portion of a circular lens indicated by a phantom line. The gap formed at the joint portion between two mutually adjacent lenses 32Ba is extremely small compared to that of the lens array 32 shown in FIG. 6A. Hence, even when the synchronizing beam scans along a scanning line deviated from the correct scanning position, no signal dropout will occur in the synchronizing clock signal provided that the scanning line falls within a range R when the positioning error of the lens array 32B exists.

The lens arrays 32A and 32B may be made of glass lenses or injection molded from an optical plastic. The lens arrays 32A and 32B may also be constituted by holographic lenses. When plastic lenses or holographic lenses are used for the lens arrays 32A and 32B, the cost of the converging optical system can be kept down to a very low.

. According to the first through third embodiments, the precision required of the lenses constituting the lens array is not extremely high as in the case of the single concave mirror of the mirror array used in the conventional system, because the lens array as a whole receives the synchronizing beam transmitted through the grating and the lens array supplies this synchronizing beam in division to the light receiving system. Thus, the lens array can be produced with ease at a low cost. In addition, the positioning and mounting of the lens array is easy because the lens array is located between the grating and the light receiving system. A distance between the grating and the light receiving system can be set small because the grating and the lens array can be provided close together and the focal distance of the lenses constituting the lens array can be set short owing to the fact that the synchronizing beam transmitted through the grating is received in division by these lenses. As a result, the recording apparatus or document reading apparatus can be made compact. Furthermore, when one of the modifications of the lens array is used, it is possible to compensate for the positioning error of the lens array.

Next, a description will be given on a fourth embodiment of the synchronizing signal generating system according to the present invention applied to the document reading apparatus, by referring to FIG. 9. In FIG. 9, those parts which are the same as those corresponding parts in FIG. 5 are designated by the same reference numerals, and a description thereof will be omitted. The present embodiment uses the lens array 32A shown in FIGS. 7A and 7B described before, and there is a predetermined relationship in relative positions of the grating 30 and the lens array 32A.

When the lens array 32A is used, a scattering of light occurs at a junction portion between two mutually adjacent cylindrical lenses of the lens array 32A, and there inevitably is a decrease in the quantity of light reaching the corresponding light receiving element from the junction portion. As a result, the output of the light receiving element deviates and the synchronizing clock signal becomes unstable, thereby making it impossible to carry out a highly accurate synchronous detection at the junction portion. In order to ensure the generation of a highly accurate synchronizing clock signal, it is necessary to provide a compensation circuit to compensate for the output deviation of the light receiving element caused by the scattering of the reflected light at the junction portion, but the use of such a compensation circuit makes the laser scanner complex. Similar problems occur at the boundary portion between two mutually adjacent lenses of the lens array 32 and at the junction portion between two mutually adjacent lenses of the lens array 32B. Such problems also occur at a boundary portion between two mutually adjacent concave mirrors constituting a mirror array which may be used in place of the lens array.

Figure 10:
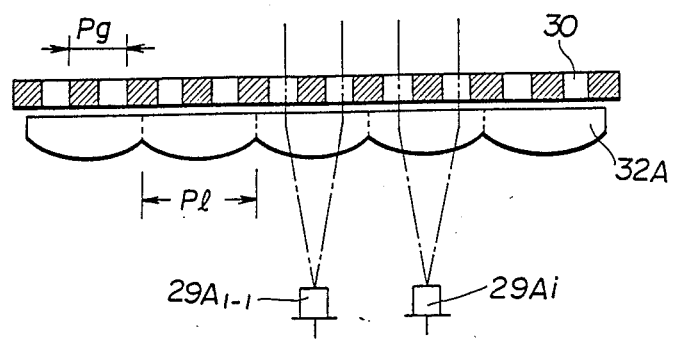
FIG. 10 shows relative positions of the lens array and the grating in the fourth embodiment.

But according to the fourth embodiment, the relative positions of the grating 30 and the lens array 32A are set as shown in FIG. 10. In FIG. 10, Pg denotes a pitch of the bright and dark portions of the grating 10, and Pl denotes a pitch of the cylindrical lenses 32Aa of the lens array 32A. A ratio Pl/Pg is set to an integer so that the dark portion of the grating 30 confronts the junction portion between two mutually adjacent cylindrical lenses 32Aa of the lens array 32A. For example, Pl/Pg=2 in the present embodiment.

Therefore, the synchronizing beam transmitted through the grating 30 will not reach the junction portion between the two mutually adjacent cylindrical lenses 32Aa of the lens array 32A, and the scattering of light will not occur at the junction portion. It is thus possible to generate a highly accurate synchronizing clock signal even at the junction portion.

Figure 11A:
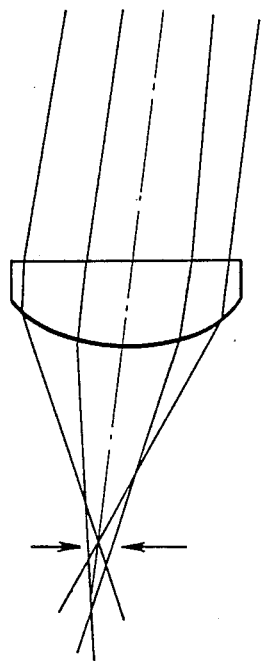
FIGS. 11A and 11B are diagrams for explaining the converging of light by the lens array depending on the arrangement thereof.

In the fourth embodiment, a flat side of the lens array 32A faces the grating 30 as shown in FIG. 10. But as shown in FIG. 11A, the flat side of the lens array 32A does not contribute to the converging of light when the flat side of the lens array 32A is in close contact with the grating 30. In other words, only the curved side of the lens array 32A contributes to the converging of light, and the spherical aberration is large. As a result, the light does not sharply converge, and in this case, it is necessary to use a light receiving element having a relatively large light receiving area. However, the operating speed of such a light receiving element having the relatively large light receiving area is slow because of its poor frequency characteristic. From the point of view of enabling a high speed operation of the recording apparatus or document reading apparatus, it is preferable to use a light receiving element which has a small light receiving area and is operable at a high speed.

Similar problems occur when the light converged by the lens array 32A is first received by the receiving ends of the optical fibers $29B_1$ through $29B_n$. That is, when the lens array 32A does not sharply converge the light at the receiving ends of the optical fibers $29B_1$ through $29B_n$, the information based on which the synchronizing clock signal is generated is not accurately transmitted to the light receiving element $29B_b$. In this case, it is difficult to generate a highly accurate synchronizing clock signal.

Figure 11B:
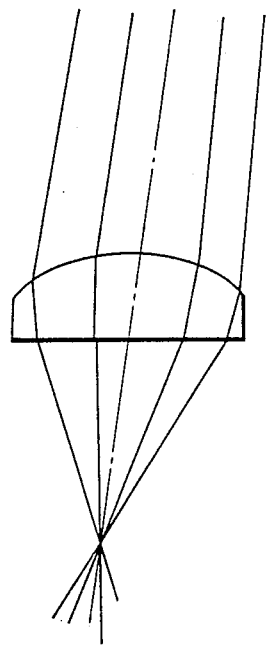

On the other hand, if the synchronizing beam transmitted through the grating 30 is first received by the curved side of the lens array 32A, both the curved side and the flat side of the lens array 32 contribute to the converging of light as shown in FIG. 11B. Hence, it can be seen that it is more preferable to position the lens array 32A so that the curved side thereof faces the grating 30.

Figure 12:
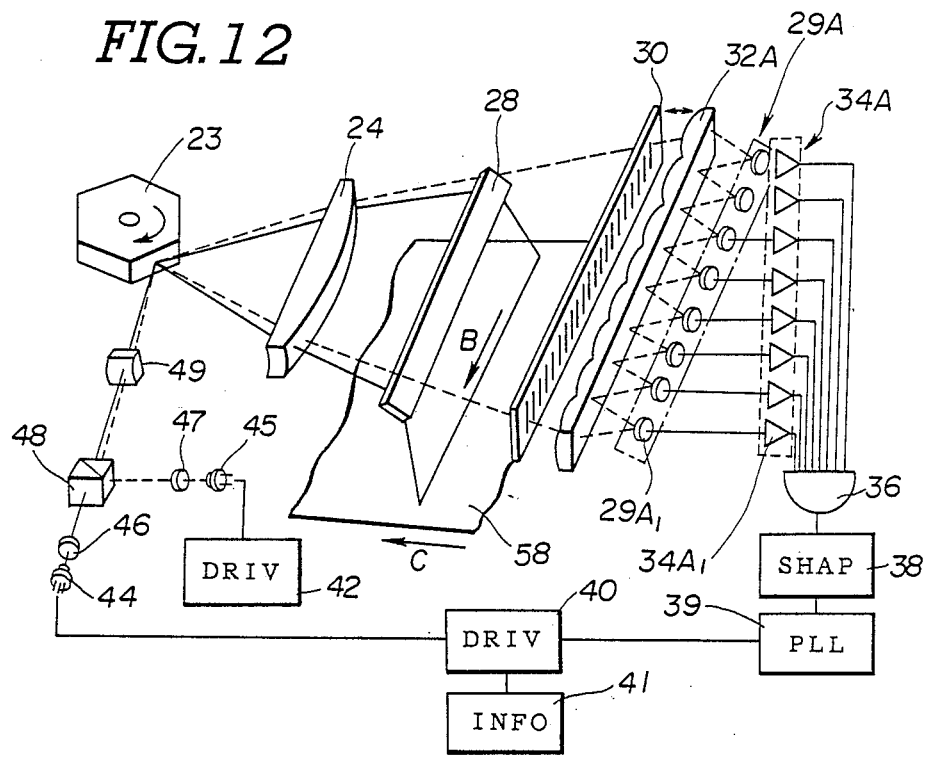
FIG. 12 generally shows an essential part of a fifth embodiment of the synchronizing signal generating system according to the present invention applied to the recording apparatus.

FIG. 12 shows an essential part of a sixth embodiment of the synchronizing signal generating system according to the present invention applied to the recording apparatus. In FIG. 12, those parts which are the same as those corresponding parts in FIG. 3 are designated by the same reference numerals, and a description thereof will be omitted.

In FIG. 12, a recording beam is emitted from a laser diode 44 and a synchronizing beam is emitted from a laser diode 45. The recording and synchronizing beams are collimated by respective collimator lenses 46 and 47 and reach a deflection beam splitter 48. The recording and synchronizing beams from the deflection beam splitter 48 are directed to the polygonal mirror 23 by a cylindrical lens 49 which is provided for beam shaping. The recording and synchronizing beams land at approximately the same positions on the mirror surface of the polygonal mirror 23 but with slightly different incident angles. Therefore, the recording and synchronizing beams are deflected along slightly different directions. Projections of the deflected recording and synchronizing beams on a plane perpendicular to a rotary axis of the polygonal mirror 23 intersect.

The recording beam indicated by a solid line reaches a recording medium 58 such as a photosensitive drum or sheet by way of the fθ-lens 24 and a mirror 28. Hence, the recording beam scans the recording medium 58 as the polygonal mirror 23 rotates. For example, the recording beam scans in a direction B and the recording medium 58 is fed in a direction C every time one scan is completed. On the other hand, the synchronizing beam indicated by a phantom line is directed to the grating 30 after being transmitted through the fθ-lens 24. The synchronizing beam scans the grating 30 as the polygonal mirror 23 rotates.

The output pulse signal of the adder 36 is dependent on the arrangement of the bright and dark portions of the grating 30, and this output pulse signal is supplied to a shaping circuit 38. An output synchronizing clock signal of the shaping circuit 38 is supplied to a phase locked loop circuit (clock control circuit) 39 which outputs the image clock signal. This image clock signal is applied to a laser diode driver 40 so as to control the recording timing (that is, scan timing). The laser diode driver 40 drives the laser diode 44 in synchronism with the incoming image clock signal depending on data entered from an information source 41. Since the synchronizing clock signal is generated based on the synchronizing beam, the driving timing of the laser diode 44 is automatically adjusted even when the rotational speed of the polygonal mirror 23 becomes unstable during the recording operation. Therefore, the recording operation is carried out with an appropriate scan timing. A laser diode driver 42 drives the laser diode 45.

Figure 13:
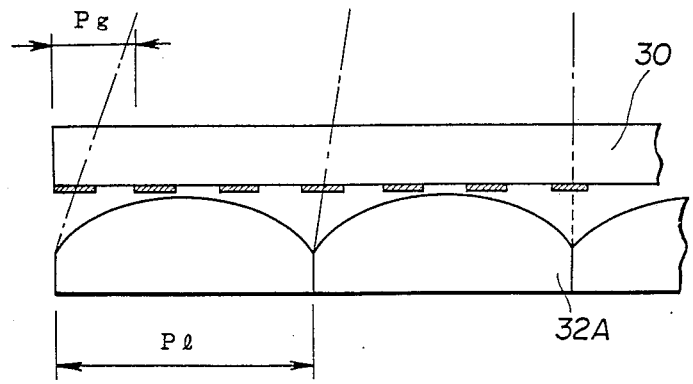
FIG. 13 shows relative positions of the lens array and the grating in the fifth embodiment.

In FIG. 12, the relative positions of the grating 30 and the lens array 32A are set as shown in FIG. 13 so that the curved side of the lens array 32A faces the grating 30. Although the grating 30 and the lens array 32A are shown in FIG. 12 with a gap formed therebetween, it is more desirable to provide the grating 30 and the lens array 32A close together as shown in FIG. 13.

In FIG. 13, the pitch P1 of the lens array 32A is selected to slightly greater than an integral multiple of the pitch Pg of the grating 30. FIG. 13 shows the case where the pitch P1 is slightly greater than three times the pitch Pg. As a result, the light which would normally reach the joint portion between the two mutually adjacent lenses 32Aa of the lens array 32A as indicated by a phantom line is positively blocked by the grating 30 as indicated by a one-dot chain line. Hence, the scattering of light is prevented from occurring at the boundary portion between the two mutually adjacent lense 32A of the lense array 32A, and the stability of the synchronizing clock signal is ensured. Furthermore, since the curved side of the lens array 32A faces the grating 30, the light is sharply converged on the corresponding light receiving elements $29A_1$ through $29A_n$ of the light receiving system 29A. Hence, a high-speed light receiving element having a small light receiving surface may be used for the light receiving elements $29A_1$ through $29A_n$.

Figure 14:
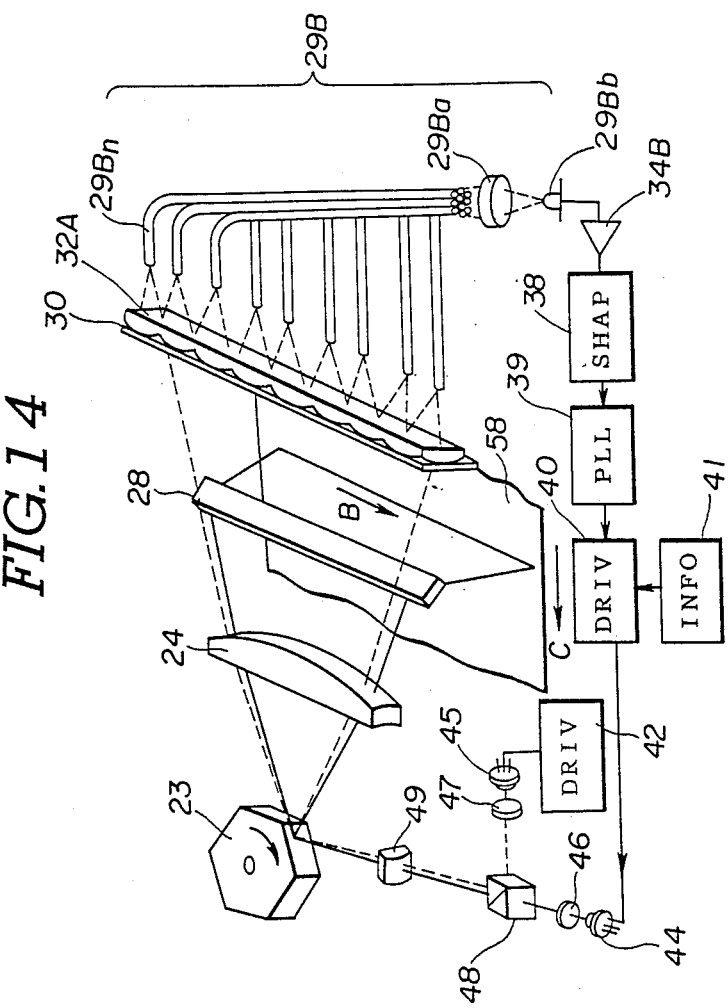
FIG. 14 generally shows an essential part of a sixth embodiment of the synchronizing signal generating system according to the present invention applied to the recording apparatus.

FIG. 14 shows an essential part of a sixth embodiment of the synchronizing signal generating system according to the present invention applied to the recording apparatus. In FIG. 14, those parts which are the same as those corresponding parts in FIGS. 4 and 12 are designated by the same reference numerals, and a description thereof will be omitted.

According to the sixth embodiment, since the curved side of the lens array 32A faces the grating 30, the light is sharply converged on the corresponding receiving ends of the optical fibers $29B_1$ through $29B_n$ of the light receiving system 29B. Thus, the information based on which the synchronizing clock signal is generated is accurately transmitted to the light receiving element $29B_b$, and it is possible to generate a highly accurate synchronizing clock signal.

The fifth and sixth embodiments may also be applied to the case where a mirror array comprising mirrors are used in place of the lens array 32A, as will be described later in the specification.

Figure 15A:
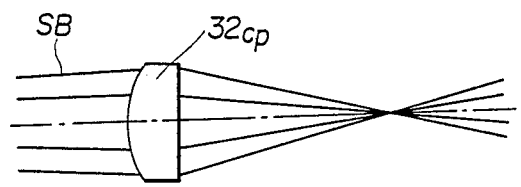
FIGS. 15A through 15C respectively show an essential part of the lens array for explaining the convergence of light.
Figure 15B:
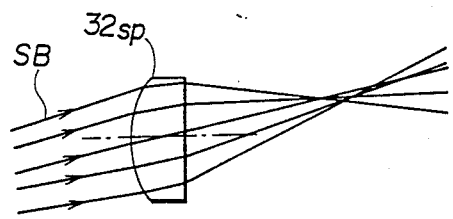

According to the embodiments described heretofore, the optical axes of the lenses constituting the lens array are parallel to each other. However, in the case of the lens array 32, for example, the synchronizing beam SB is received approximately perpendicularly to the flat side of the lens array 32 at the central portion of the lens array 32 as shown in FIG. 15A, while the synchronizing beam SB is received with an angle at the side portions of the lens array 32 as shown in FIG. 15B. In other words, the synchronizing beam SB is approximately parallel to the optical axis of a lens $32_{cp}$ located at the central portion of the lens array 32, but the synchronizing beam SB is not parallel to the optical axis of a lens $32_{sp}$ located at the side portions of the lens array 32. As a result, the synchronizing beam SB converges sharply only at the central portion of the lens array 32 and not at the side portions of the lens array 32. This means that the light receiving elements which receive the converged light must have a large light receiving area, but the operation speed of such a light receiving element is slow because of its poor frequency characteristic.

Figure 15C:
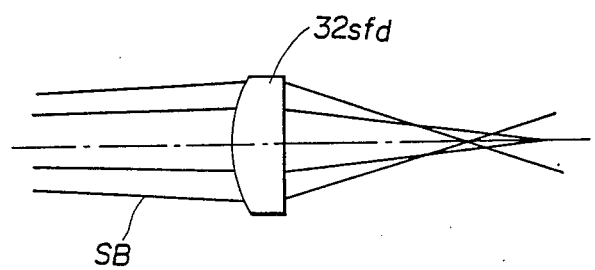

In addition, when the focal distance of the lenses constituting the lens array 32, for example, is set short so as to make the recording apparatus or document reading apparatus compact, the spherical aberration becomes large and it becomes necessary to use a light receiving element having an extremely large light receiving area, as may be seen from FIG. 15C. FIG. 15C shows a lens $32_{sfd}$ of the lens array 32 having a short focal distance.

Similar problems occur when the converged light from the lens array 32 or the like is received by the light receiving system 29B. In this case, the lens array 32 does not sharply converge the light at the receiving ends of the optical fibers $29B_1$ through $29B_n$, and the information based on which the synchronizing clock signal is generated is not accurately transmitted to the light receiving element $29B_b$. Hence, it is difficult to generate a highly accurate synchronizing clock signal, as described before.

The above described problems caused by the non-uniform convergence of the light by the lens array depending on the scanning position of the synchronizing beam also occurs when a mirror array is used in place of the lens array as the converging optical system.

Next, a description will be given on seventh and eighth embodiments of the synchronizing signal generating system applied to the recording apparatus or document reading apparatus, in which these problems caused by the non-uniform convergence of the light by the converging optical system are eliminated.

Figure 16:
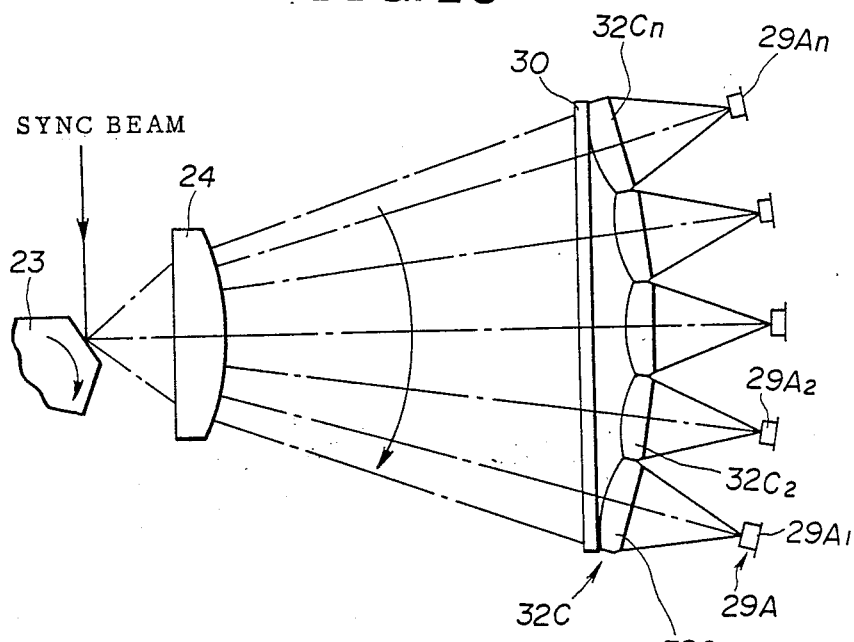
FIG. 16 generally shows an essential part of a seventh embodiment of the synchronizing signal generating system according to the present invention applied to the recording apparatus or document reading apparatus.

FIG. 16 shows an essential part of the seventh embodiment. In FIG. 16, those parts which are the same as those corresponding parts in FIG. 12 are designated by the same reference numerals, and a description thereof will be omitted. In the present embodiment, a converging optical system 32C comprises lenses $32C_1$ through $32C_n$ which are arranged along a curve as shown, so that the synchronizing beam transmitted through the grating 30 is approximately parallel to the optical axes of the lenses $32C_1$ through $32C_n$. In other words, the synchronizing beam passing the centers of the lenses $32C_1$ through $32C_n$ coincide with the optical axes thereof. As a result, it is possible to satisfactorily converge the synchronizing beam, and the converged beam spot caused by the aberration is small. For this reason, a light receiving element having small light receiving area and operable at a high speed may be used for the light receiving elements $29A_1$ through $29A_n$. Therefore, the seventh embodiment can be applied to a high speed recording apparatus or document reading apparatus.

Figure 17:
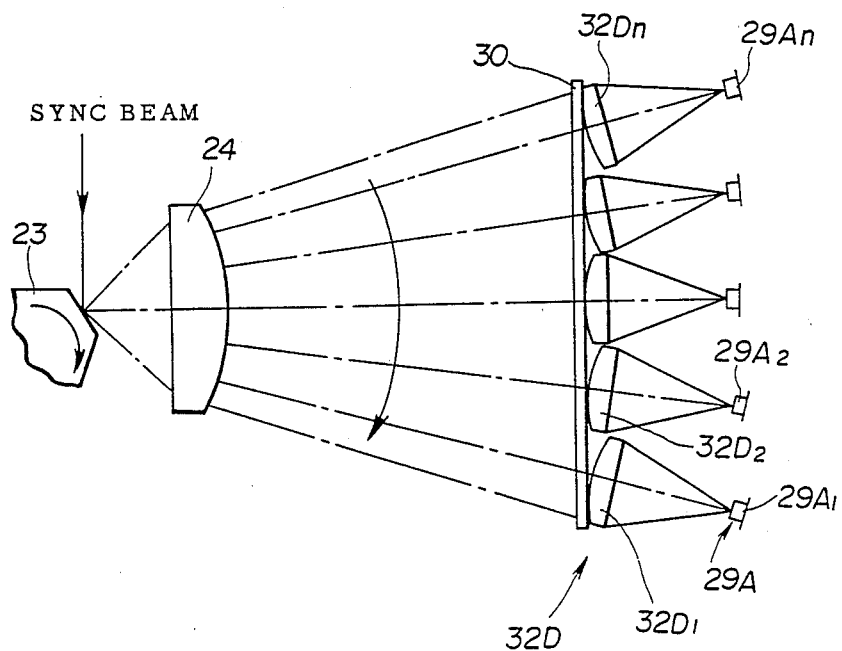
FIG. 17 generally shows an essential part of an eighth embodiment of the synchronizing signal generating system according to the present invention applied to the recording apparatus or document reading apparatus.

FIG. 17 shows an essential part of the eighth embodiment. In FIG. 17, those parts which are the same as those corresponding parts in FIG. 12 are designated by the same reference numerals, and a description thereof will be omitted. In the present embodiment, a converging optical system 32D comprises lenses $32D_1$ through $32D_n$ which are arranged generally along a line as shown, so that the synchronizing beam transmitted through the grating 30 is approximately parallel to the optical axes of the lenses $32D_1$ through $32D_n$. In other words, the synchronizing beam passing the centers of the lenses $32D_1$ through $32D_n$ coincide with the optical axes thereof. According to the present embodiment, it is possible to obtain the same effects as those obtainable in the seventh embodiment.

Figure 18:
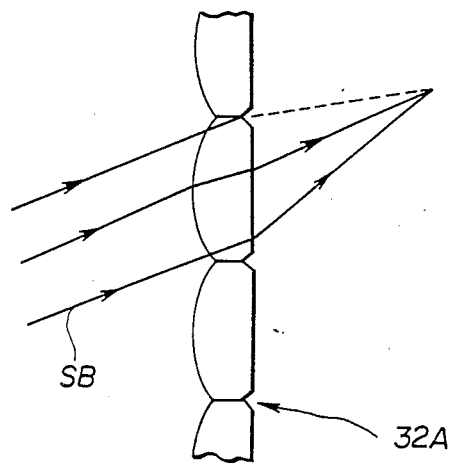
FIG. 18 shows an essential part of the lens array for explaining the convergence of light at a chamfered portion of the lens.

It is possible to reduce the optical path between the $f\theta$-lens 24 and the grating 30 (and the converging optical system) by using a wide angle lens for the $f\theta$-lens 24. But in the case of the lens array 32A described before, for example, the convergence of light at the peripheral portion of each lens of the lens array 32A is poor especially because the edge portion of the lens is usually chamfered. The edge portion of the lens is chamfered to prevent the edge portion from chipping. Consequently, at the peripheral portion of the lens, the synchronizing beam may not converge correctly as indicated by a phantom line in FIG. 18. When the synchronizing beam is kicked at the chamfered edge portion of the lens and does not reach the corresponding light receiving element, a correct synchronizing clock signal cannot be obtained.

But in the seventh and eighth embodiments, the optical axes of the lenses $32C_1$ through $32C_n$ (or $32D_1$ through $32D_n$) of the converging optical system 32C (or 32D) coincide with the synchronizing beam which passes the centers of these lenses $32C_1$ through $32C_n$ (or $32D_1$ through $32D_n$). For this reason, the above described problem caused by the chamfered edge portion of the lenses will not occur even when the wide angle lens is used for the $f\theta$-lens 24.

Although an illustration thereof will be omitted, it is evident that the converging optical systems 32C and 32D can be applied to the recording apparatus or document reading apparatus which uses the light receiving system 29B. In addition, the seventh and eighth embodiments are basically applicable to the case where the mirror array comprising the concave mirrors is used in place of the lens array, as will be described later in the specification.

According to the embodiments described heretofore which use the plurality of light receiving elements in the light receiving system, the number of light receiving elements used is large. Consequently, the recording apparatus or document reading apparatus using such a light receiving system becomes expensive.

Next, a description will be given on a ninth embodiment of the synchronizing signal generating system according to the present invention, in which the number of light receiving elements can be effectively reduced.

Figure 19:
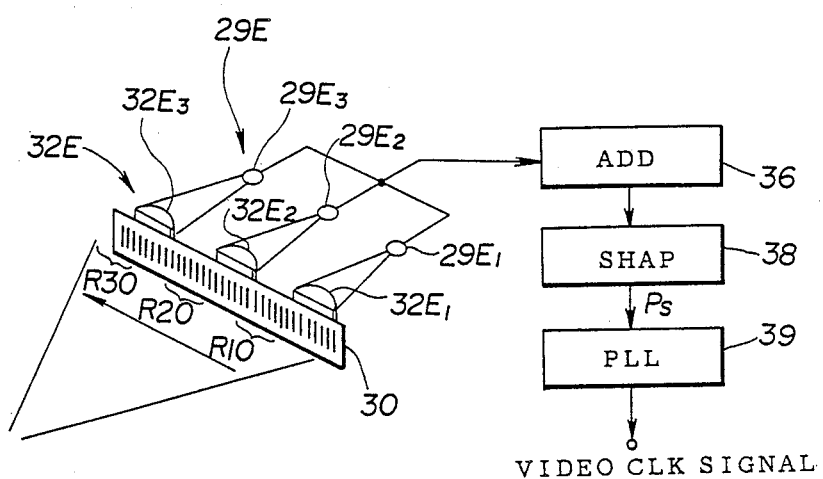
FIG. 19 generally shows an essential part of a ninth embodiment of the synchronizing signal generating system according to the present invention applied to the recording apparatus.

FIG. 19 shows an essential part of the ninth embodiment. In FIG. 19, those parts which are the same as those corresponding parts in FIG. 12 are designated by the same reference numerals, and a description thereof will be omitted. The present embodiment comprises a converging optical system 32E and a light receiving system 29E. The converging optical system 32E comprises convex lenses $32E_1$ through $32E_3$ and the light receiving system 29E comprises light receiving elements $29E_1$ through $29E_3$ provided in correspondence with the convex lenses $32E_1$ through $32E_3$.

The convex lenses $32E_1$ through $32E_3$ are arranged at predetermined intervals along the scanning direction of the synchronizing beam. The light receiving elements $29E_1$ through $29E_3$ are arranged at such positions that the light transmitted through the convex lenses $32E_1$ through $32E_3$ are converged on respective light receiving areas of the light receiving elements $32E_1$ through $32E_3$. In this case, the synchronizing clock signal Ps is obtained intermittently from the shaping circuit 38.

The linearity characteristic of the scanning position of the synchronizing beam transmitted through the $f\theta$-lens 24 with respect to the synchronizing beam angle $\theta$ is shown in FIG. 20. For this reason, when the dots are recorded on the recording medium 58 with a constant period by the recording beam which is also transmitted through the $f\theta$-lens 24, a moire occurs as shown in FIG. 21. For this reason, the convex lenses $32E_1$ through $32E_3$ are arranged within such ranges so as to include inflection points $IP_1$ through $IP_3$ of the linearity characteristic of the $f\theta$-lens 24.

Figure 23:
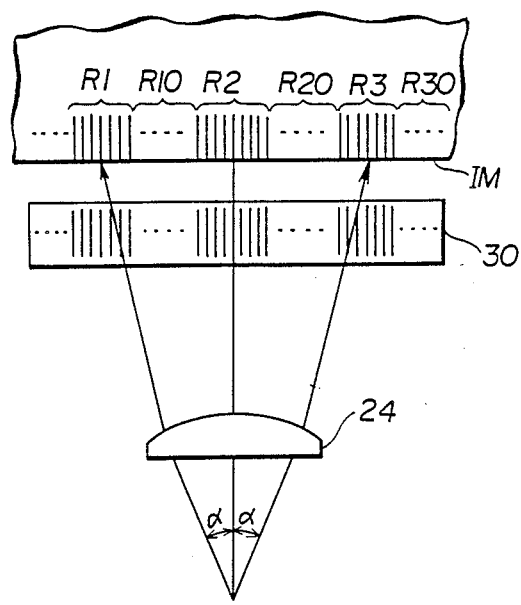
FIG. 23 is a diagram for explaining the non-existence of moire when the synchronizing beam is transmitted through the grating in the ninth embodiment.

Since the inflection points $IP_1$, $IP_2$ and $IP_3$ respectively occur at the synchronizing beam angles $\theta$ of $+\alpha$, 0 and $-\alpha$, the convex lenses $32E_1$, $2E_2$ and $32E_3$ are arranged as shown in FIG. 22. That is, the convex lenses $32E_1$, $32E_2$ and $32E_3$ are arranged within respective ranges R1, R2 and R3 centered to converge at the synchronizing beam angles $\theta$ of $+\alpha$, 0 and $-\alpha$, respectively. According to this arrangement of the convex lenses $32E_1$, $32E_2$ and $32E_3$, the positional error (moire) in the recording position of the dots caused by the linearity characteristic of the $f\theta$-lens 24 can be suppressed to a small value $\Delta L$. As a result, the moiré does not occur when the synchronizing beam transmitted through the grating 30 reaches the positions of the convex lenses $32E_1$, $32E_2$ and $32E_3$, that is, the ranges R1, R2 and R3, as may be seen from FIG. 23. In FIG. 23, IM denotes an imaginary plane on which the lenses $32E_1$, $32E_2$ and $32E_3$ are provided, and this imaginary plane IM is parallel to the grating 30. For convenience' sake, the imaginary plane IM is shown separated from the grating 30, but this imaginary plane IM is actually located immediately on the rear of the grating 30.

Figure 24:
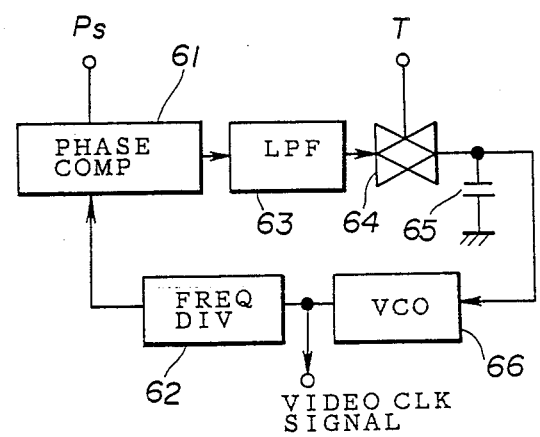
FIG. 24 is a system block diagram showing an embodiment of a phase locked loop circuit shown in FIG. 19.
Figure 25:
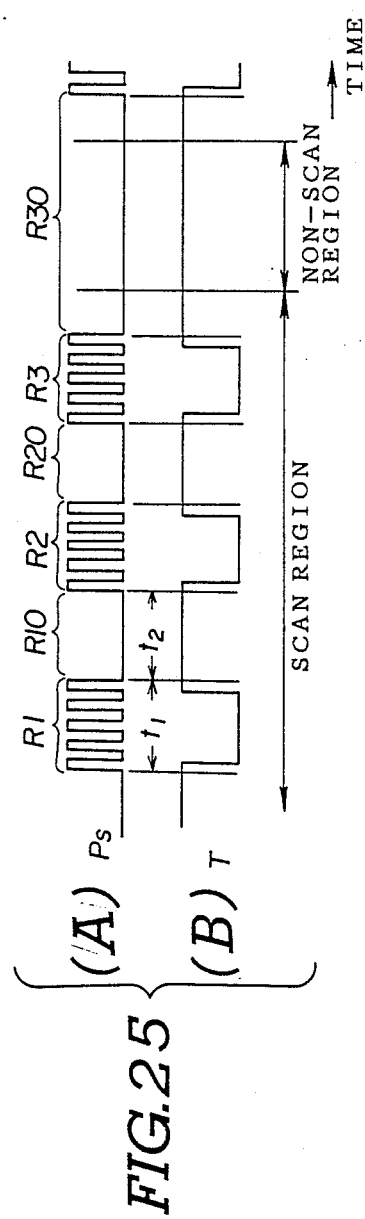
FIGS. 25(A) and 25(B) are time charts for explaining the operation of the phase locked loop circuit shown in FIG. 24.

FIG. 24 shows an embodiment of the PLL circuit 39, and FIGS. 25(A) and 25(B) are time charts for explaining the operation of the PLL circuit 39. The PLL circuit 39 comprises a phase comparator (phase detector) 61, a frequency divider 62, a lowpass filter 63, an analog switch 64, a capacitor 65, and a voltage controlled oscillator (VCO) 66.

The synchronizing clock signal Ps is supplied intermittently to the phase comparator 61 because the convex lenses $32E_1$, $32E_2$ and $32E_3$ are arranged within the respective ranges R1, R2 and R3 shown in FIG. 22 so as to converge the synchronizing beam. No synchronizing clock signal Ps is supplied to the phase comparator 61 within ranges R10, R20 and R30. The synchronizing clock signal Ps is shown in FIG. 25(A). The phase comparator 61 detects a phase error between the output synchronizing clock signal Ps of the shaping circuit 38 and an output signal of the frequency divider 62. An output signal of the phase comparator 61 dependent on a phase error between the two compared signals is passed through the lowpass filter 63, the analog switch 64 and the capacitor 65 and applied to the VCO 66 to control an oscillation frequency thereof. An output signal of the VCO 66 is supplied to the frequency divider 62 and the VCO 66 oscillates in synchronism with the output synchronizing clock signal Ps of the shaping circuit 38. The output signal of the VCO 66 is outputted as the image clock signal.

The analog switch 64 is turned ON and OFF responsive to a signal T shown in FIG. 25(B). Immediately before the time periods corresponding to the ranges R10, R20 and R30 in which no synchronizing clock signal Ps is received from the shaping circuit 38, the analog switch 64 is already turned OFF by the signal T. For example, the analog switch 64 is turned OFF by the signal T immediately before a time period t2, and the capacitor 65 holds the input voltage to the VCO 66 before the synchronizing clock signal Ps ceases. Accordingly, the oscillation frequency of the VCO 66 is suppressed. In addition, the synchronizing clock signal Ps is received during the time periods corresponding to the ranges R1, R2 and R3. For example, during a time period t1, the synchronizing clock signal Ps from the shaping circuit 38 is supplied to the phase comparator 61, and the analog switch 64 is turned ON to apply the output signal of the lowpass filter 63 to the VCO 66 through the capacitor 65 when the output signal of the lowpass filter 63 reaches a voltage near the voltage held by the capacitor 65.

Therefore, the image clock signal is controlled by the synchronizing clock signal which is derived from the synchronizing beam transmitted through the grating 30 within the ranges R1, R2 and R3 including the inflection points $IP_1$, $IP_2$ and $IP_3$ of the linearity characteristic of the $f\theta$-lens 24. On the other hand, within the ranges R10, R20 and R30, it is possible to suppress the error in the linearity characteristic of the $f\theta$-lens 24 to $\Delta L$ by holding the input voltage of the VCO 66 during the times corresponding to the ranges R10, R20 and R30. In other words, the positional error (moiré) in the recording position of the dots can be corrected.

Figure 26:
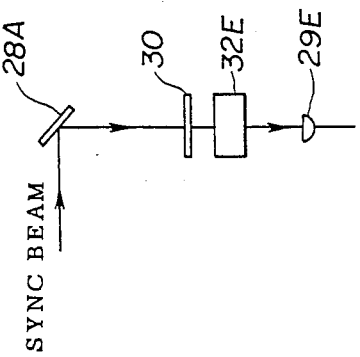
FIG. 26 shows an essential part of a first modification of the ninth embodiment.

In the present embodiment, it is assumed that the mirror 28 reflects the recording beam onto the recording medium 58 as in the recording apparatus shown in FIG. 12. However, as a first modification of the ninth embodiment, it is possible to employ a reverse arrangement in which the synchronizing beam is reflected by a mirror 28A toward the grating 30 as shown in FIG. 26. In FIG. 26, those parts which are the same as those corresponding parts in FIG. 19 are designated by the same reference numerals, and a description thereof will be omitted.

Figure 27:
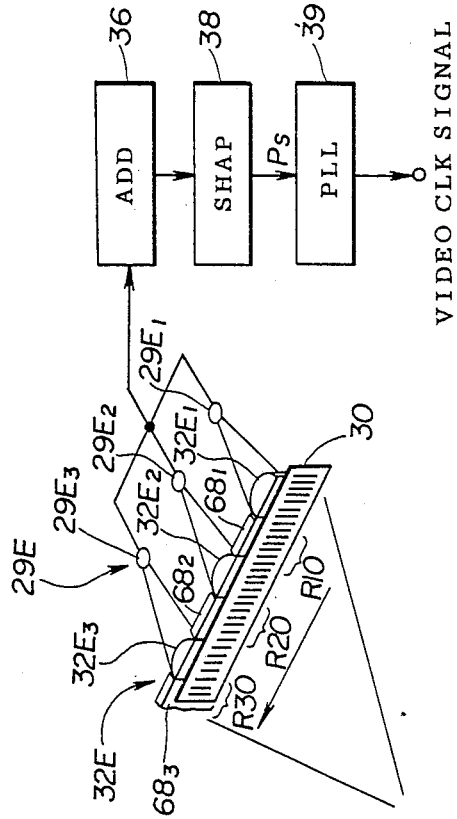
FIG. 27 shows an essential part of a second modification of the ninth embodiment.

FIG. 27 shows an essential part of a second modification of the ninth embodiment. In FIG. 27, those parts which are the same as those corresponding parts in FIG. 19 are designated by the same reference numerals, and a description thereof will be omitted. Plates $68_1$, $68_2$ and $68_3$ respectively block the grating 30 within the ranges R10, R20 and R30. Hence, it is possible to prevent a noise from mixing into the synchronizing clock signal Ps due to a light component which may enter the convex lenses $32E_1$ through $32E_3$ through the grating 30 within the ranges R10, R20 and R30.

As a third modification of the ninth embodiment, it is possible to use a grating which has the bright and dark portions (or slits and non-slits) formed only within the ranges R1, R2 and R3.

Therefore, according to the ninth embodiment and the modifications thereof, it is possible to obtain an accurate synchronizing clock signal by use of only a small number of lenses in the converging optical system and a corresponding small number of light receiving elements in the light receiving system.

As described before for the conventional apparatus using the mirror array, the duty cycle of the synchronizing clock signal also becomes unstable at the boundary portion between the two mutually adjacent lenses of the lens array such as those used in FIGS. 3, 4, 5, 9, 12 and 14. In extreme cases, a signal dropout occurs at the boundary portion. Usually, the PLL circuit 39 is used to match the phase of the image clock signal with that of the synchronizing clock signal, and the image clock signal is used to enable and disable the recording operation. Similarly as in the case shown in FIG. 24, the PLL circuit 39 comprises a phase comparator for comparing the phases of the synchronizing clock signal from the shaping circuit and an output signal of a VCO which is controlled by an output control voltage of the phase comparator, and the output signal of the VCO is used as the image clock signal.

For this reason, the unstable duty cycle of the synchronizing clock signal and the signal dropout in the synchronizing clock signal cause the PLL circuit to run from the locked state and cause a sudden change in the oscillation frequency of the VCO. In these cases, the synchronizing clock signal becomes unstable and deteriorates the quality of the recording made on the recording medium. In terms of the frequency, the change in the duty cycle of the synchronizing clock signal causes a voltage change in the output control voltage of the phase comparator, and this change in the control voltage causes a frequency change in the image clock signal. The change in the frequency of the image clock signal appears as moiré and the like on the recording medium and greatly deteriorates the quality of the recording.

Next, descriptions will be given on embodiments of the synchronizing signal generating system which compensates for the signal dropout in the synchronizing clock signal electrically.

Figure 28:
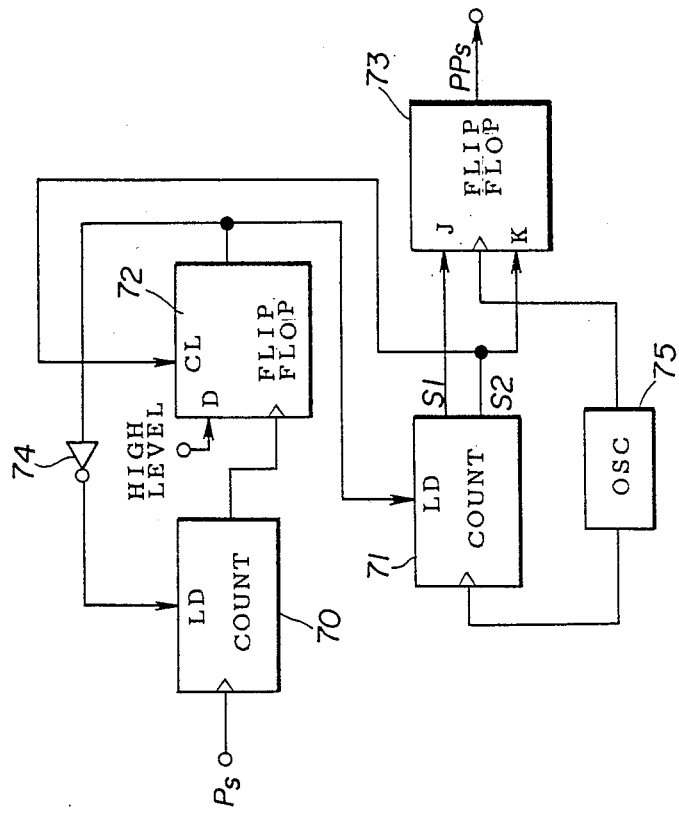
FIG. 28 is a system block diagram showing an essential part of an electrical system of a tenth embodiment of the synchronizing signal generating system according to the present invention.

FIG. 28 shows an essential part of an electrical system of a tenth embodiment of the synchronizing signal generating system according to the present invention. The electrical system includes a pseudo synchronizing clock signal generating circuit. The pseudo synchronizing clock signal generating circuit comprises counters 70 and 71, flip-flops 72 and 73, an inverter 74, and an oscillator 75.

Figure 29:
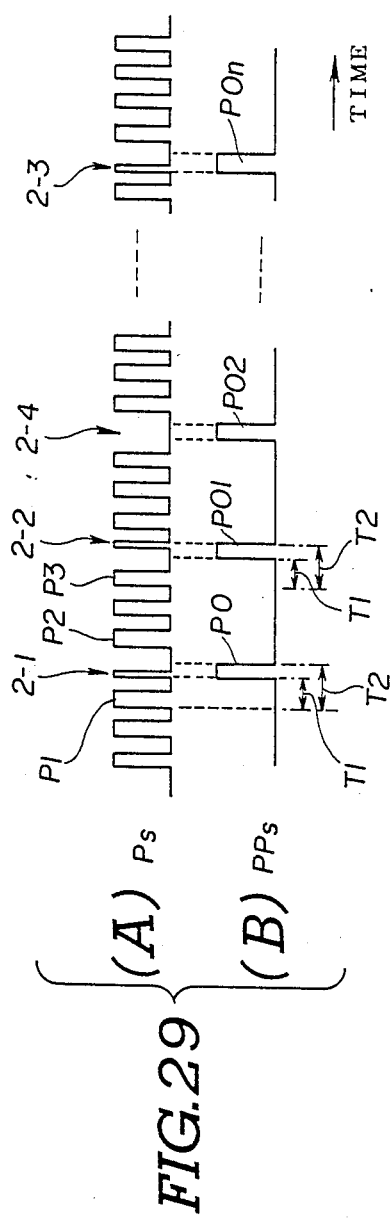
FIGS. 29(A) and 29(B) are timing charts for explaining the operation of the electrical system shown in FIG. 28.

The synchronizing clock signal Ps shown in FIG. 29(A) is outputted from the shaping circuit 38 such as that shown in FIG. 12 and is supplied to a clock terminal of the counter 70. The synchronizing clock signal Ps includes portions 2-1 through 2-3 where the duty cycle varies and a portion 2-3 where a signal dropout occurs. These portions 2-1 through 2-4 each correspond to the joint between two mutually adjacent lenses of the lens array (for example, 32A) which constitutes the converging optical system. When the counter 70 counts a pulse P1 shown in FIG. 29(A) which occurs immediately before an unstable pulse at the portion 2-1 corresponding to the joint, the counter 70 supplies a signal to a clock terminal of the D flip-flop 72. A high-level signal is constantly applied to an input terminal D of the flip-flop 72. When the flip-flop 72 receives the output signal of the counter 70, the flip-flop 72 releases the counter 71 from the load state and puts the counter 71 into an enable state by supplying a signal to a load terminal LD of the counter 71. In addition, this output signal of the flip-flop 72 is supplied to a load terminal LD of the counter 70 through the inverter 74 so as to put the counter 70 into a load state.

When the counter 71 assumes the enable state, the counter 71 starts to count output pulses of the oscillator 75. The output pulses of the oscillator 75 are high-frequency pulses having a sufficient resolution with respect to the synchronizing clock signal Ps. Ideal set times T1 and T2 are preset in the counter 71 depending on the ideal pulse form of the synchronizing clock signal Ps, and the counter 71 outputs a signal s1 when the count reaches the set time T1 and outputs a signal s2 when the count reaches the set time T2. The signals s1 and s2 are respectively supplied to terminals J and K of the JK flip-flop 73. The flip-flop 73 generates a pseudo synchronizing clock pulse P0 shown in FIG. 29(B) having a pulse width (T2-T1). The pulse width (T2-T1) is set so as to coincide with the correct duty cycle To of the synchronizing clock signal Ps.

The output signal s2 of the counter 71 is also supplied to a clear terminal CL of the flip-flop 72. For this reason, the flip-flop 72 returns the counter 70 to the enable state responsive to the signal s2. The counter 70 thus starts to count the synchronizing clock signal Ps from a pulse P2 thereof. On the other hand, the counter 71 assumes the load state until the counter 70 counts a pulse P3 of the synchronizing clock signal Ps. Similarly as in the case described before, the flip-flop 73 generates a pseudo synchronizing clock pulse P01 having a pulse width (T2-T1) when the counter 70 counts the pulse P3. By repeating such operations, the flip-flop 73 generates pseudo synchronizing clock pulses P0, P01, P02, ..., P0n having identical pulse width and phase as the pulses constituting the synchronizing clock signal Ps, at the portions 2-1 through 2-4 where the duty cycle of the synchronizing clock signal Ps changes or a signal dropout occurs in the synchronizing clock signal Ps.

Therefore, the portions 2-1 through 2-4 of the synchronizing clock signal Ps where the duty cycle is unstable or the signal dropout occurs can be replaced by pseudo synchronizing clock pulses P0, P01, ..., P0n of a pseudo synchronizing clock signal PPs shown in FIG. 29(B). Accordingly, it is possible to obtain a synchronizing clock signal Ps having a stable duty cycle and no signal dropout.

The joint between two mutually adjacent lenses of the lens array which constitutes the converging optical system occurs periodically, and the relationship between the pulses of the synchronizing clock signal Ps and the joints is determined by the mechanical relationship between the grating and the converging optical system. Hence, it is easy to determine how many pulses of the synchronizing clock signal Ps would be received between two successive joints. In other words, in order for the counter 70 to count the pulses P1 and P3 shown in FIG. 29(A) as the pulses immediately before the respective joints in the converging optical system, it is simply necessary to predict from the above described relationship how many pulses of the synchronizing clock signal Ps would be received from one joint to immediately before the next joint.

Figure 30:
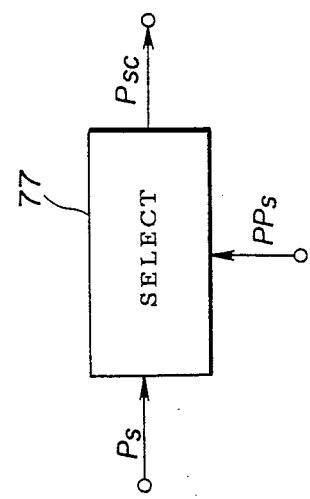
FIG. 30 is a block diagram showing an embodiment of a correcting circuit for producing a corrected synchronizing clock signal from a pseudo synchronizing clock signal generated in the tenth embodiment.

FIG. 30 shows an embodiment of a correcting circuit for correcting the synchronizing clock signal Ps. The synchronizing clock signal Ps from the shaping circuit 38 and the pseudo synchronizing clock signal PPs from the pseudo synchronizing clock signal generating circuit shown in FIG. 28 are supplied to a selector 77. The selector 77 selectively outputs the pseudo synchronizing clock signal PPs during the time periods corresponding to the junction in the converging optical system and outputs the synchronizing clock signal Ps during other periods. As a result, a corrected synchronizing clock signal Psc having a stable duty cycle and no signal dropout is obtained from the selector 77. This corrected synchronizing clock signal Psc is supplied to the PLL circuit 39.

According to the tenth embodiment, it is possible to effectively prevent the duty cycle of the synchronizing clock signal from becoming unstable and prevent a signal dropout in the synchronizing clock signal. An accurate synchronizing clock signal is obtainable even at the portions corresponding to the joints in the converging optical system by use of the pseudo synchronizing clock pulses generated in the pseudo synchronizing clock signal generating circuit.

Next, a description will be given on an eleventh embodiment of the synchronizing signal generating system according to the present invention in which the undesirable effects caused by unstable duty cycle of the synchronizing clock signal are eliminated.

Figure 31:
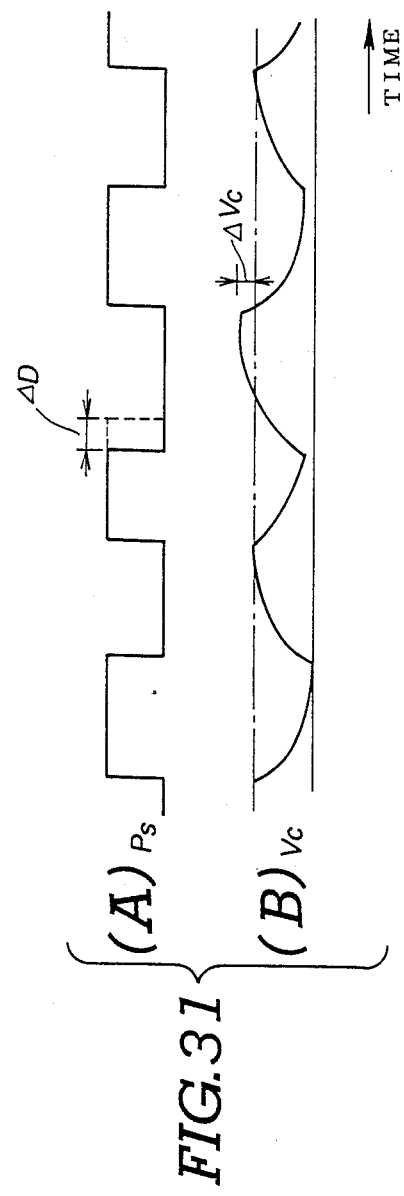
FIGS. 31(A) and 31(B) are time charts for explaining a change in a control voltage of a voltage controlled oscillator within the phase locked loop circuit caused by a change in a duty cycle of the synchronizing clock signal.

As described before, the unstable duty cycle of the synchronizing clock signal and the signal dropout in the synchronizing clock signal cause the PLL circuit to run from the locked state and cause a sudden change in the oscillation frequency of the VCO within the PLL circuit. In these cases, the image clock signal becomes unstable and deteriorates the quality of the recording made on the recording medium. And, in terms of the frequency, a change $\Delta D$ in the duty cycle of the synchronizing clock signal Ps shown in FIG. 31(A) causes a voltage change $\Delta Vc$ in the output control voltage Vc of the phase comparator shown in FIG. 31(B) for controlling the VCO, and this change in the control voltage Vc causes a frequency change in the image clock signal which is outputted from the VCO. The change in the frequency of the image clock signal appears as moiré and the like on the recording medium and greatly deteriorates the quality of the recording.

Figure 32:
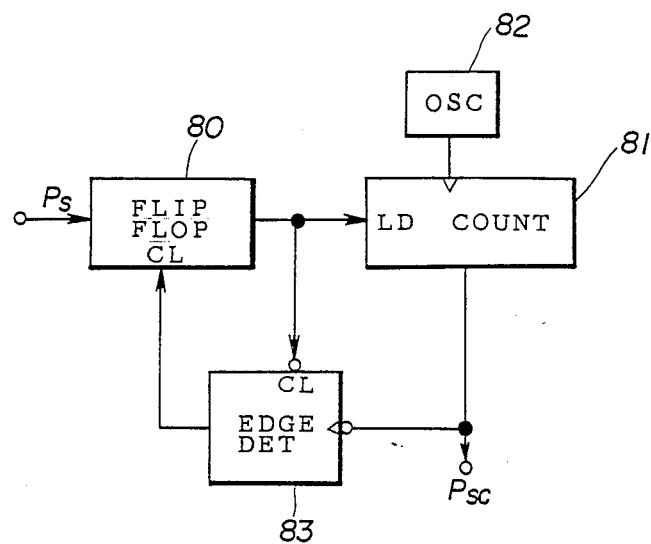
FIG. 32 is a system block diagram showing an essential part of an electrical system of an eleventh embodiment of the synchronizing signal generating system according to the present invention.

FIG. 32 shows an essential part of an electrical system of the eleventh embodiment of the synchronizing signal generating system according to the present invention. The electrical system includes a correction circuit. The correction circuit comprises a flip-flop 80, a counter 81, an oscillator 82 and an edge detector 83.

Figure 33:
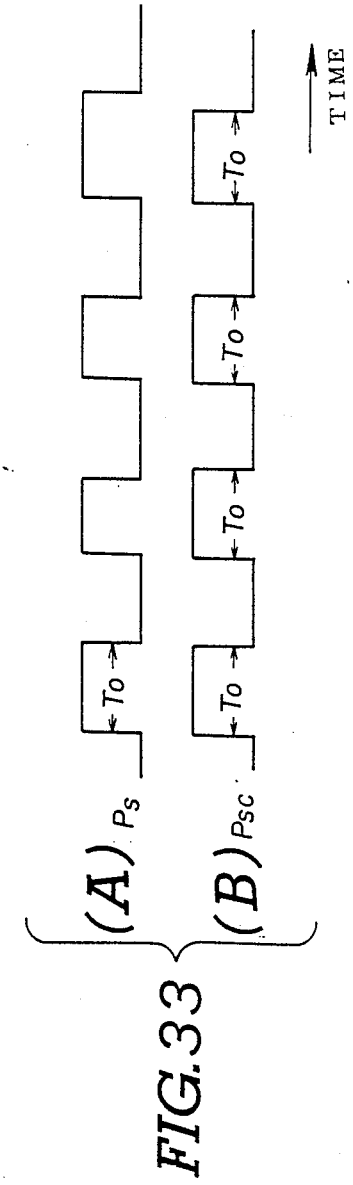
FIGS. 33(A) and 33(B) are timing charts for explaining the operation of the eleventh embodiment.

As shown in FIG. 33(A), the synchronizing clock signal Ps should have a constant duty cycle To but the duty cycle inevitably changes at the joint portions of the converging optical system. This synchronizing clock signal Ps including the inevitable change in the duty cycle is supplied to the flip-flop 80. The flip-flop 80 sets the counter 81 and the edge detector 83 to a ready state at the rising edge of the synchronizing clock signal Ps, by supplying an output signal of the flip-flop 80 to a load terminal LD of the counter 81 and to a clear terminal CL of the edge detector 83.

The oscillator 82 outputs a pulse signal having a sufficiently high frequency with respect to the synchronizing clock signal Ps, that is, a sufficiently high resolution with respect to the synchronizing clock signal Ps. This output pulse signal of the oscillator 82 is supplied to a clock terminal of the counter 81. The counter 81 counts pulses of the pulse signal received from the oscillator 82 when set to the ready state by the flip-flop 80, and produces a pulse signal Psc having a predetermined time width To, that is, the duty cycle To. This pulse signal Psc is outputted as the corrected synchronizing clock signal on one hand, and is supplied to a clock terminal of the edge detector 83 on the other.

The edge detector 83 clears the flip-flop 80 by supplying a signal to a clear terminal CL of the flip-flop 80 when a falling edge of the pulse signal Psc is detected. When the flip-flop 80 is cleared, the counter 81 is returned to the initial state, that is, the load state, and the edge detector 83 is cleared. The flip-flop 80 is released from the cleared state when the edge detector 83 is cleared and the correcting circuit is ready to detect the next pulse of the synchronizing clock signal Ps. As a result, a pulse of the corrected synchronizing clock signal Psc shown in FIG. 33(B) which has the constant duty cycle To is generated every time the pulse of the synchronizing clock signal Ps is received. The corrected synchronizing clock signal Psc is supplied to the PLL circuit (not shown).

Since the duty cycle To of the corrected synchronizing clock signal Psc is constant, no change is generated in the control voltage Vc of the VCO within the PLL circuit. Accordingly, the frequency of the image clock signal generated from the corrected synchronizing clock signal Psc is stable, thereby enabling the laser beam to scan with an accurate scan timing. Of course, the present embodiment cannot cope with the case where a signal dropout occurs in the synchronizing clock signal Ps, and it is assumed that some measure is taken to ensure that no signal dropout occurs and only the change in the duty cycle of the synchronizing clock signal Ps may occur.

Next, description will be given on embodiments of the synchronizing signal generating system according to the present invention in which a pseudo synchronizing clock signal is generated to correct unstable portions of the synchronizing clock signal.

Figure 34:
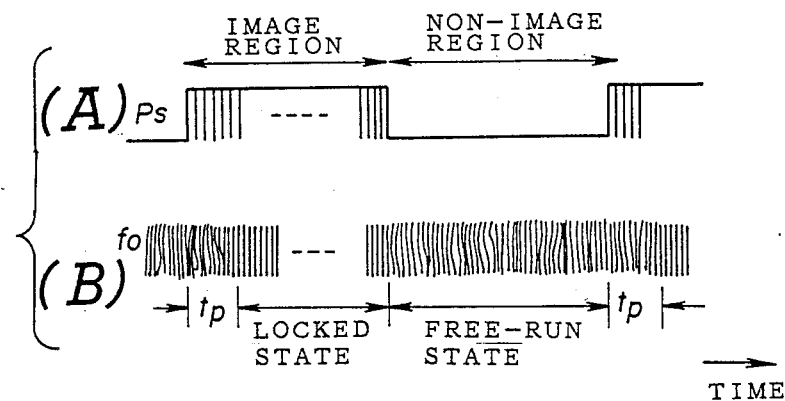
FIGS. 34(A) and 34(B) show signal waveforms for explaining the pull-in time of the PLL circuit.

As shown in FIG. 34(A), the synchronizing clock signal Ps which is supplied to the PLL circuit is generated intermittently, that is, generated in an image region and not generated in a non-image region. The image region refers to a scan duration in which the recording beam scans the recording medium and the recording is made in the case of the recording apparatus, while the non-image region refers to a non-scan duration in which the recording beam makes no recording on the recording medium in the case of the recording apparatus.

In the non-image region, the VCO of the PLL circuit oscillates at the free-running frequency $f_o$ and the output of the VCO is obtained as the output of the PLL circuit, that is, the image clock signal shown in FIG. 34(B). For this reason, even when the synchronizing clock signal Ps is received subsequent to the non-image region, it takes a pull-in time $t_p$ for the oscillation frequency of the VCO to stabilize so that the output of the VCO can be used as the image clock signal. Normally, the length of the grating along the scanning direction of the synchronizing beam is extended by a length corresponding to the pull-in time $t_p$ to start the recording after the oscillation frequency of the VCO stabilizes. However, the oscillation frequency of the VCO changes to a temperature change, and this oscillation frequency change causes a change in the pull-in time $t_p$. Consequently, the PLL circuit may not be locked when the image region is reached thereby making it impossible to correctly synchronize each scan.

It is possible to conceive a method of sampling the holding the control voltage supplied to the VCO, but in this case, a discontinuity occurs between the sampled value in the image region and the held value in the non-image region because this method is also easily affected by the temperature change. As a result, this discontinuity causes instability in the oscillation frequency of the VCO, and it is impossible to correctly synchronize each scan.

Figure 35:
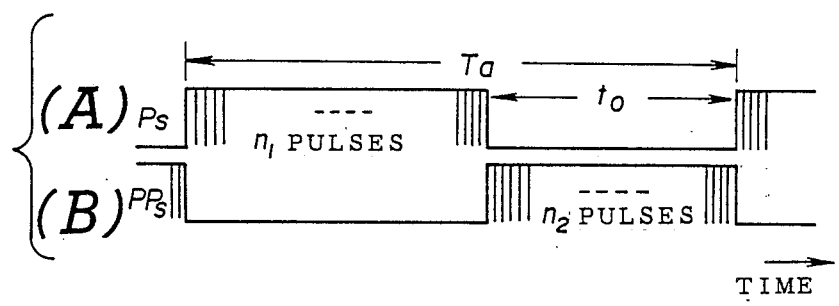
Figure 36:
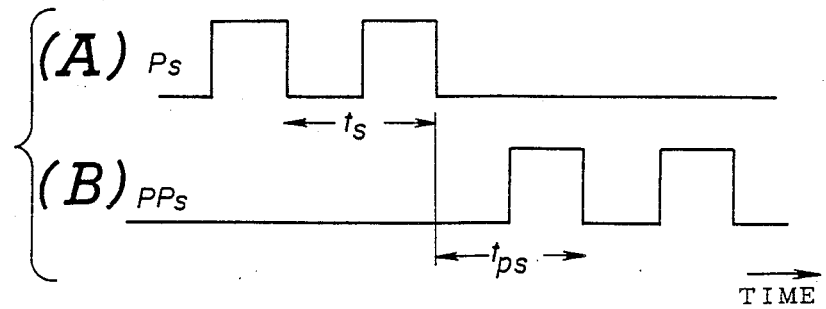

In a twelfth embodiment of the synchronizing signal generating system according to the present invention, the pseudo synchronizing clock signal is generated within the entire non-image region. FIGS. 35(A) and 35(B) show the relationship between the synchronizing clock signal Ps and the pseudo synchronizing clock signal PPs generated in the present embodiment. FIGS. 36(A) and 36(B) respectively show encircled portions of the synchronizing clock signal Ps and the pseudo synchronizing signal PPs on an enlarged scale. Ta denotes the scanning period, ts denotes the period of the synchronizing clock signal Ps, tps denotes the period of the pseudo synchronizing clock signal PPs, n1 denotes the number of pulses of the synchronizing clock signal Ps in one scanning period Ta, n2 denotes the number of pulses of the pseudo synchronizing clock signal PPs in one scanning period Ta, and $t_o$ denotes the duration of the non-image region. A relation Ta=n×ts stands, where n=n1+n2.

Figure 37:
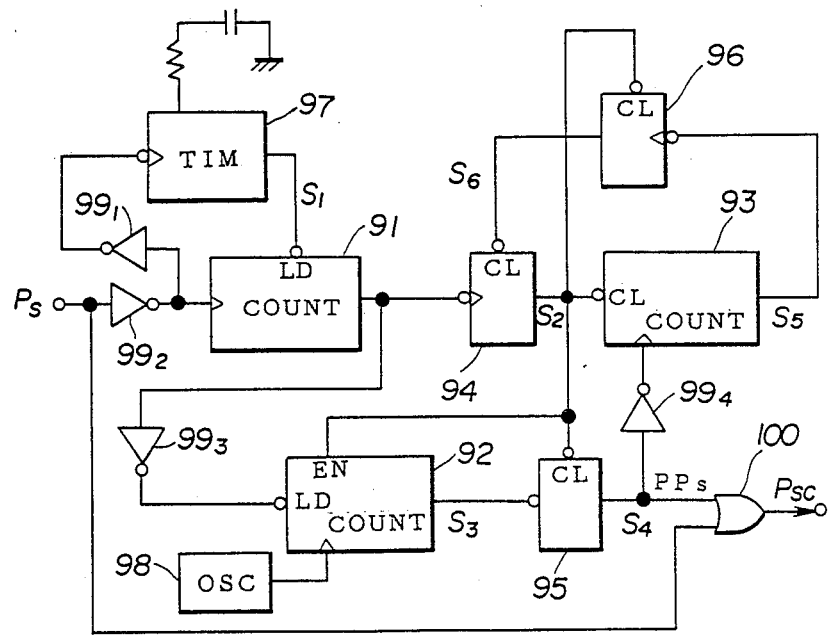
FIG. 37 is a system block diagram showing an essential part of an electrical system of a twelfth embodiment of the synchronizing signal generating system according to the present invention.

FIG. 37 shows an essential part of an electrical system of the twelfth embodiment of the synchronizing signal generating system according to the present invention, and FIGS. 38(A) through 38(H) are timing charts for explaining the operation of the electrical system shown in FIG. 37. The electrical system includes a correcting circuit for correcting the synchronizing clock signal Ps by use of the pseudo synchronizing clock signal PPs. The correcting circuit comprises counters 91 through 93, flip-flops 94 through 96, a timer 97, an oscillator 98, inverters $99_1$ through $99_4$ and an OR circuit 100 which are connected as shown in FIG. 37.

The synchronizing clock signal Ps shown in FIG. 38(A) is applied to the inverter $99_2$ and an inverted synchronizing clock signal $\overline{Ps}$ shown in FIG. 38(B) is applied to a clock terminal of the counter 91. The inverted synchronizing clock signal $\overline{Ps}$ is again inverted in the inverter $99_1$ and is applied to a clock terminal of the timer 97. The timer 97 outputs a pulse signal S1 shown in FIG. 38(C) having a pulse width PW satisfying ts<PW <$t_o$−ts. The counter 91 loads a number (n1−2) of pulses to be counted responsive to a first rise r1 in the inverted synchronizing clock signal $\overline{Ps}$, that is, responsive to the pulse signal S1. And, the counter 91 starts to count the pulses responsive to a second rise r2 in the inverted synchronizing clock signal $\overline{Ps}$. When (n1−2) pulses are counted in the counter 91, the counters 92 and 93 are set to ready states by an output signal S2 of the flip-flop 94 shown in FIG. 38(D). The counter 92 counts output pulses of the oscillator 98 having a sufficiently high resolution and outputs a signal S3 shown in FIG. 38(E) for every ts/2. The flip-flop 95 frequency-divides the signal S3 by two and outputs a pulse signal S4 shown in FIG. 38(F). The counter 93 counts an inverted signal $\overline{S4}$ which is obtained through the inverter $99_4$, and outputs a signal S5 shown in FIG. 38(G) when n2 pulses are counted. The signal S5 is applied to a clock terminal of the flip-flop 96. The flip-flop 96 outputs a signal S6 shown in FIG. 38(H) for clearing the flip-flop 94. When the flip-flop 94 is cleared, the counter 92 is disabled, while the counter 93 and the flip-flop 96 are cleared. The flip-flop 94 assumes the ready state with respect to the output of the counter 91 when the flip-flop 96 is cleared. The timer 97 clears the counted value of the counter 91 in the non-image region.

The OR circuit 100 is supplied with the synchronizing clock signal Ps and the pseudo synchronizing clock signal PPs outputted from the flip-flop 95. Hence, a corrected synchronizing clock signal Psc is outputted from the OR circuit 100 and is supplied to the PLL circuit. The corrected synchronizing clock signal Psc is made up of the pulses having the period ts in both the image region and the non-image region. Accordingly, the pull-in time for the PLL circuit to lock in is only required when the power source is turned ON, and once locked in, the PLL circuit can generate a stable image clock signal from the corrected synchronizing clock signal Psc for the entire image region. This means that the length of the grating need only correspond to the length of the image region, and it is possible to reduce both the overall size and cost of the recording apparatus or document reading apparatus applied with the synchronizing signal generating system.

According to the present embodiment, the frequency of the pseudo synchronizing clock signal PPs is identical to the frequency of the synchronizing clock signal Ps in the image region. In addition, the synchronizing clock signal Ps and the pseudo synchronizing clock signal PPs are generated so that the frequencies thereof are an integral multiple of the scanning frequency.

Next, a description will be given on a thirteenth embodiment of the pseudo synchronizing signal generating system according to the present invention. As indicated by $t_{e1}$ and $t_{e2}$ in FIG. 39, durations of the non-image region may become different due to an error in the angular separation of two mutually adjacent mirror surfaces of the polygonal mirror. Ideally, the angular separation of two mutually adjacent mirror surfaces of the polygonal mirror is constant, but an error inevitably occurs in the production process. The difference between the durations te1 and te2 is usually within Tps/2, where Tps denotes the period of the synchronizing clock signal Ps. Hence, when the pseudo synchronizing clock signal PPs is generated after a predetermined time from the end of the synchronizing clock signal Ps, the phase of the pseudo synchronizing clock signal PPs shown in FIG. 40(A) may be matched to the phase of the synchronizing clock signal Ps shown in FIG. 40(B) at a time tA, but the phase of the pseudo synchronizing clock signal PPs shown in FIG. 41(A) may be inverted with respect to the phase of the synchronizing clock signal Ps shown in FIG. 41(B) at a time tB. In FIG. 41(A), Δte denotes a phase shift in the synchronizing clock signal Ps caused by the error in the angular separation between two mutually adjacent mirror surfaces of the polygonal mirror. In this case, the output of the VCO in the PLL circuit becomes unstable, that is, the image clock signal becomes unstable. Furthermore, there is a danger in that the PLL circuit may run from the locked state due to the unstable output of the VCO.

Figure 42:
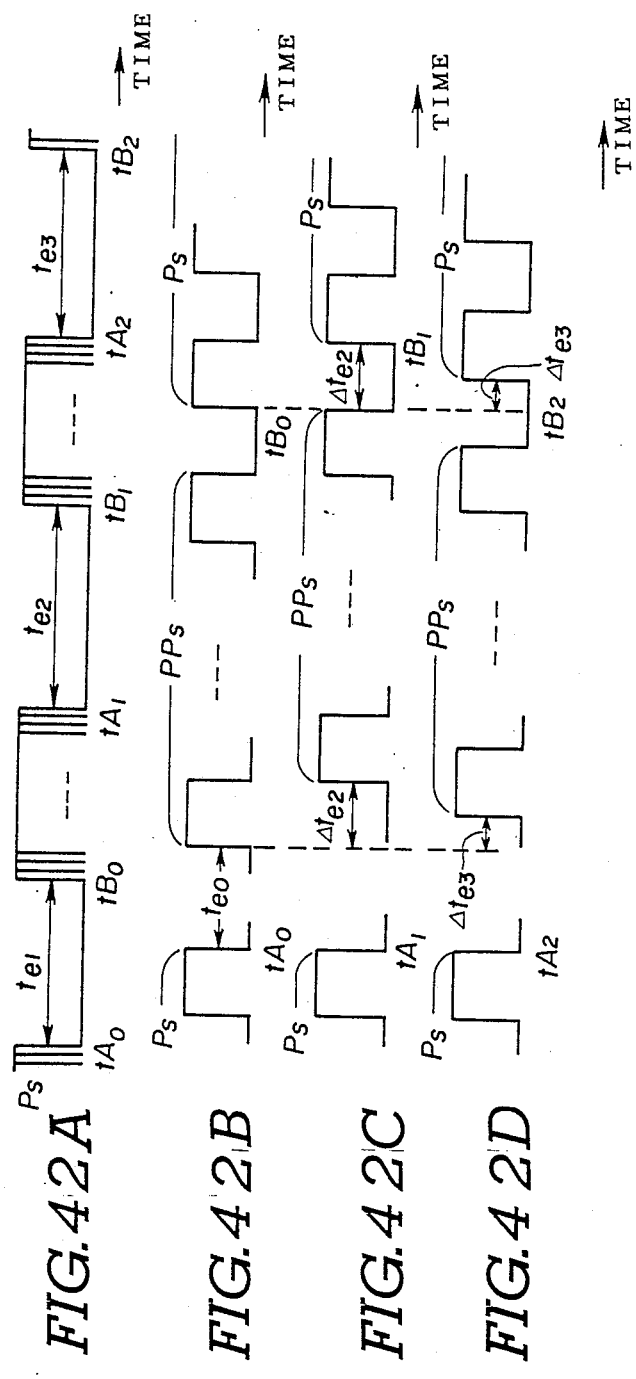
FIGS. 42A through 42D are timing charts for explaining the operating principle of a thirteenth embodiment of the synchronizing signal generating system.

In the thirteenth embodiment, the generating timing of the pseudo synchronizing clock signal PPs is varied appropriately so as to match the phase of the pseudo synchronizing clock signal PPs with the phase of the synchronizing clock signal Ps, to generate a stable image clock signal. In other words, the pseudo synchronizing clock signal PPs is generated as shown in FIGS. 42B through 42D at the times tA0, tA1 and tA2 indicated in FIG. 42A which shows the synchronizing clock signal Ps. The time scales of FIGS. 42B through 42D are enlarged compared to that of FIG. 42A. The durations $t_{e1}, t_{e2}, t_{e3}, \ldots, t_{em}$ of the non-image region can be obtained with ease, where m denotes the number of mirror surfaces of the polygonal mirror.

When it is assumed that the duration $t_{e1}$ with the smallest subscript is the shortest of the durations $t_{e1}$ through $t_{em}$, the pseudo synchronizing clock signal PPs is generated as shown in FIG. 42eB. In other words, after the synchronizing clock signal Ps ends at a time tA0 shown in FIG. 42A, the pseudo synchronizing clock signal PPs is generated after a time $t_{e0}$ from the time tA0. In this case, the phase of the pseudo synchronizing clock signal PPs matches the phase of the synchronizing clock signal Ps at the time tB0 in FIG. 42B. The pseudo synchronizing clock signal PPs is generated after the synchronizing clock signal Ps ends at the time tA1 in FIG. 42C, with a timing $\Delta$te2 delayed with respect to the generating timing of FIG. 42B. Hence, the phase of the pseudo synchronizing clock signal PPs matches the phase of the synchronizing clock signal Ps at the time tB1 in FIG. 42C. The pseudo synchronizing clock signal PPs is generated after the synchronizing clock signal Ps ends at the time tA2 in FIG. 42D, with a timing $\Delta$te3 delayed with respect to the generating timing of FIG. 42B. Thus, the phase of the pseudo synchronizing clock signal PPs matches the phase of the synchronizing clock signal Ps at the time tB2 in FIG. 42D. Therefore, the phase of pseudo synchronizing clock signal PPs matches the phase of the synchronizing clock signal Ps at the time tBM because after the synchronizing clock signal Ps ends at a time tAM, the pseudo synchronizing clock signal PPs is generated with a timing $\Delta$teM delayed with respect to the generating timing of FIG. 42B, where $\Delta teM = t_{eM} - t_{el}$ and M=2, 3, ..., m.

Figure 43:
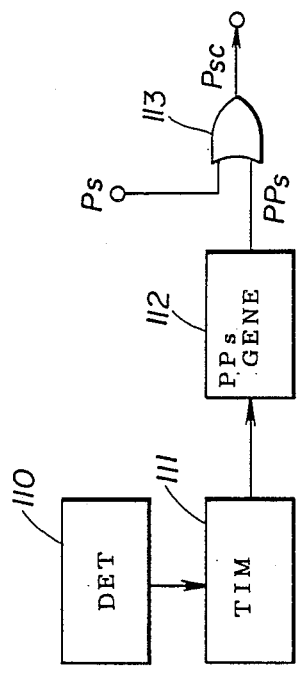
FIG. 43 is a system block diagram showing an essential part of an electrical system of the thirteenth embodiment of the synchronizing signal generating system according to the present invention.

FIG. 43 shows an essential part of an electrical system of the thirteenth embodiment of the synchronizing signal generating system according to the present invention. The electrical system includes a correcting circuit. The correcting circuit comprises a detector 110, a timing circuit 111, a pseudo synchronizing clock signal generating circuit 112 and an OR circuit 113.

Figure 44:
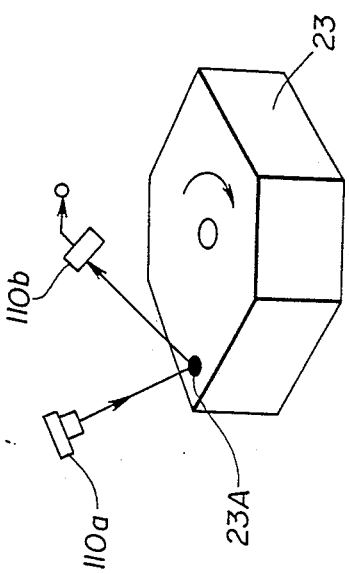
FIG. 44 shows a detector of the electrical system shown in FIG. 43 together with the polygonal mirror.

The detector 110 detects the scanning mirror surface of the polygonal mirror. As shown in FIG. 44, the detector 110 comprises a light source 110a and a light receiving element 110b. A mark 23A is provided on a top surface of the polygonal mirror 23, and this mark 23A has a coefficient of reflection different from that at other portions of the top surface. The light emitted from the light source 110a is reflected at the top surface of the polygonal mirror 23 and is received by the light receiving element 110b. Since the light emitted from the light source 110a hits the mark 23A once every revolution of the polygonal mirror 23, it is possible to know from an output detection signal of the light receiving element 110b the timing of each image region (scan duration), that is, the scanning mirror surface of the polygonal mirror 23. This output detection signal of the light receiving element 110b is supplied to the timing circuit 111. The timings (or delay timings) with which the pseudo synchronizing clock signal PPs is to be generated can be determined from the output detection signal of the detector 110. The times $t_{e1}, t_{e2}, \ldots, t_{em}$ do not change, and the m timings can be used repeatedly once determined.

Figure 46:
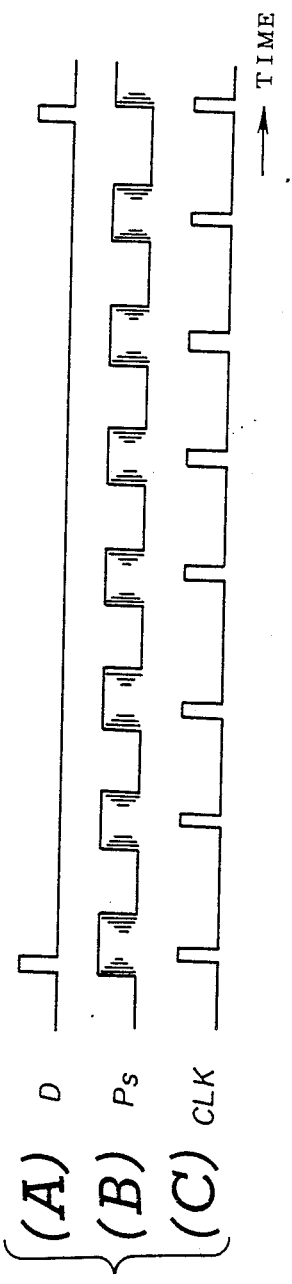
FIGS. 46(A) through 46(C) are timing charts for explaining the operation of the timing circuit shown in FIG. 45.
Figure 45:
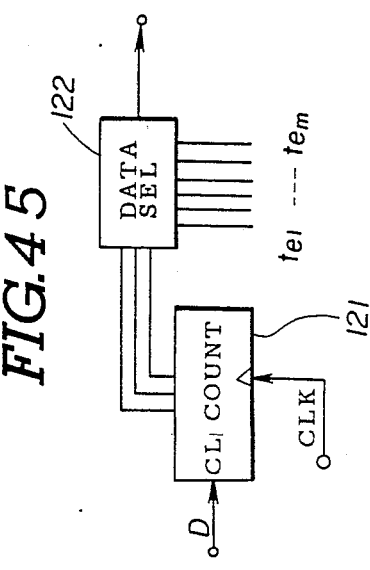
FIG. 45 is a system block diagram showing an embodiment of a timing circuit of the electrical system shown in FIG. 43.

FIG. 45 shows an embodiment of the timing circuit 111. The timing circuit 111 comprises a counter 121 and a data selector 122. A clock signal CLK shown in FIG. 46(C) is applied to a clock terminal of the counter 121. This clock signal CLK occurs once within each image region of the synchronizing clock signal Ps shown in FIG. 46(B). The output detection signal D of the detector 110 is applied to a clear terminal CL of the counter 121. Thus, the counter 121 counts pulses of the clock signal CLK and is cleared responsive to the detection signal D. The counted value in the counter 121 is supplied to the data selector 122. The data selector 122 is supplied with the durations $t_{e1}$ through $t_{em}$ and selectively outputs one of the durations depending on the counted value from the counter 121. The output of the data selector 122 is supplied to the pseudo synchronizing clock signal generating circuit 112 which generates the pseudo synchronizing clock signal PPs based on the timing determined by the output of the data selector 122.

Figure 47:
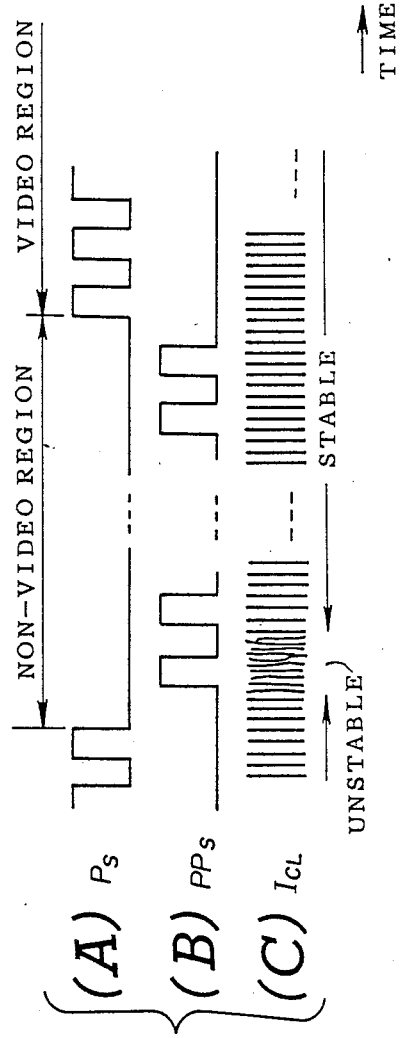
FIGS. 47(A) through 47(C) are timing charts for explaining the operation of the thirteenth embodiment.

Returning now to the description of FIG. 43, the OR circuit 113 is supplied with the synchronizing clock signal Ps and the pseudo synchronizing clock signal PPs from the pseudo synchronizing clock signal generating circuit 112, and outputs the corrected synchronizing clock signal Psc. FIGS. 47(A), 47(B) and 47(C) respectively show the synchronizing clock signal Ps, the pseudo synchronizing clock signal PPs and the image clock signal $I_{CL}$ outputted from the PLL circuit responsive to the corrected synchronizing clock signal Psc from the OR circuit 113. As may be seen from FIGS. 47(A) through 47(C), the image clock signal $I_{CL}$ may become unstable after one image region where the synchronizing clock signal Ps ends, due to the discontinuity of the pulses supplied to the PLL circuit. However, the start of the synchronizing clock signal in the next image region is in phase with the pseudo synchronizing clock signal PPs generated in the non-image region immediately preceding this next image region. Hence, the stability of the image clock signal $I_{CL}$ is substantially maintained, even when there is an error in the angular separation between two mutually adjacent mirror surfaces of the polygonal mirror.

According to the present embodiment, the frequency of the pseudo synchronizing clock signal PPs is identical to the frequency of the synchronizing clock signal Ps in the image region. In addition, the synchronizing clock signal Ps and the pseudo synchronizing clock signal PPs are generated so that the phases thereof match each other.

The tenth through thirteenth embodiments are basically applicable to the case where a mirror array comprising mirrors is used in place of the lens array, as will be described later in the specification.

Next, descriptions will be given with respect to applications of the fifth through eight embodiments to the recording apparatus or document reading apparatus employing a mirror array in place of the lens array.

Figure 48:
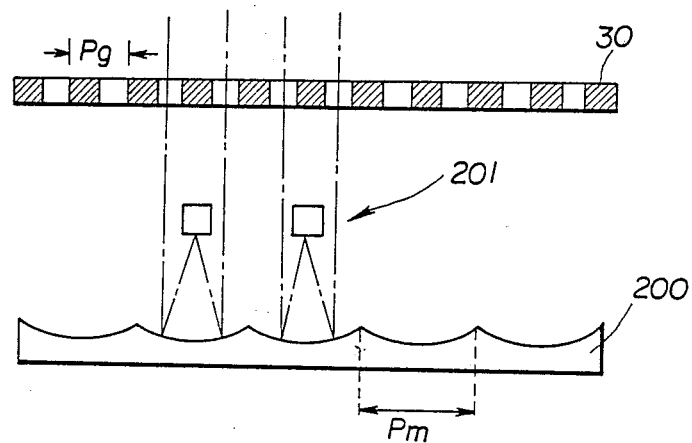
FIG. 48 shows relative positions of a mirror array and the grating in a fourteenth embodiment of the synchronizing signal generating system according to the present invention.

In a fourteenth embodiment of the synchronizing signal generating system according to the present invention, the lens array 32A is replaced by a mirror array comprising concave mirrors in the fifth and sixth embodiments shown in FIGS. 12 and 14 described before. FIG. 48 shows the relationship of the grating 30, the mirror array and the light receiving system. The remaining parts of the recording apparatus or document reading apparatus may be the same as those of the embodiments described heretofore, and an illustration and description thereof will be omitted.

In FIG. 48, the synchronizing beam transmitted through the grating 30 is reflected by the concave mirrors of the mirror array 200 and is converged at a light receiving system 201. The light receiving system 201 may comprise the light receiving elements as in the case of the fifth embodiment, or the optical fibers as in the case of the sixth embodiment. In FIG. 48, Pm denotes the pitch of the concave mirrors constituting the mirror array 200. A ratio Pm/Pg is set to an integer so that the dark portion of the grating 30 confronts the boundary portion between two mutually adjacent concave mirrors of the mirror array 200. For example, Pm/Pg=2 in the present embodiment. According to the present embodiment, it is possible to obtain substantially the same effects as those obtainable in the fifth and sixth embodiments, and the performance of the synchronizing signal generating system is greatly improved compared to that of the conventional system using the mirror array.

Figure 49:
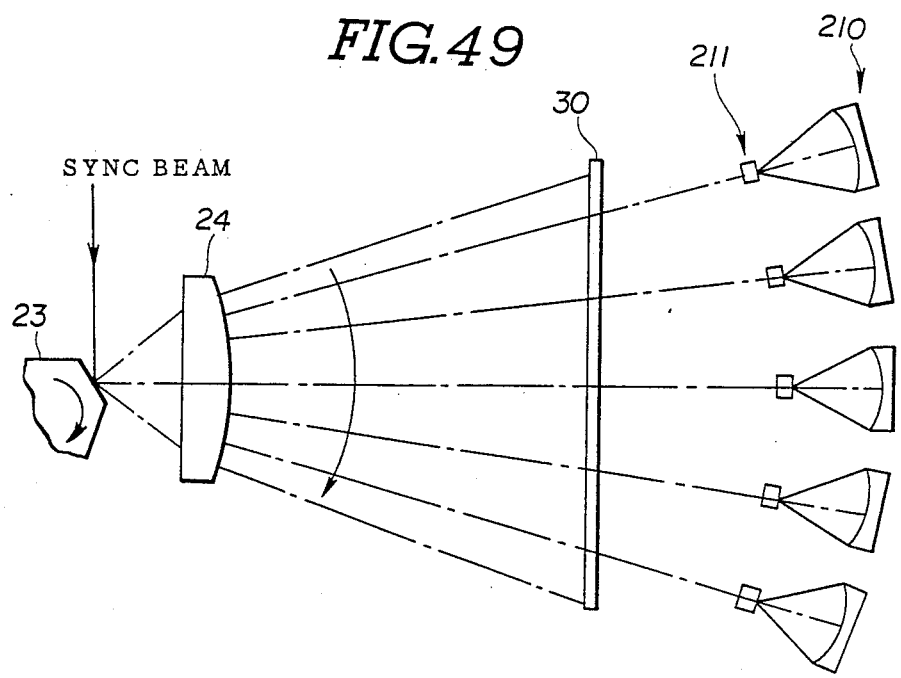
FIG. 49 generally shows an essential part of a fifteenth embodiment of the synchronizing signal generating system according to the present invention applied to the recording apparatus or document reading apparatus.

In a fifteenth embodiment of the synchronizing signal generating system according to the present invention, the converging optical system 32C is replaced by a mirror array comprising concave mirrors in the seventh embodiment shown in FIG. 16 described before. FIG. 49 shows in a plan view the relationship of the grating 30, the converging optical system and the light receiving system. The remaining parts of the recording apparatus or document reading apparatus may be the same as those of the embodiments described heretofore, and an illustration and description thereof will be omitted.

In the present embodiment, a converging optical system 210 comprises concave mirrors which are arranged along a curve as shown, so that the synchronizing beam transmitted through the grating 30 hit centers of the concave mirrors. As a result, it is possible to satisfactorily converge the synchronizing beam, and the converged beam spot caused by the aberration is small. For this reason, a light receiving element having a small light receiving area and operable at a high speed may be used for the light receiving elements of a light receiving system 211. Therefore, the present embodiment can be applied to a high speed recording apparatus or document reading apparatus, and it is possible to obtain substantially the same effects as those obtainable in the seventh embodiment.

It is readily apparent that the fifteenth embodiment may be modified so that the concave mirrors of the converging optical system are arranged generally along a line as in the case of the eighth embodiment shown in FIG. 17 described before.

Although illustration and description thereof will be omitted for convenience' sake, the tenth through thirteenth embodiments for electrically correcting the synchronizing clock signal may be similarly applied to the case where the converging optical system comprises the mirror array as in the case of the fourteenth and fifteenth embodiments. Substantially the same effects are obtainable, thereby considerably improving the performance compared to the conventional system using the mirror array.

A description is given of an improvement on the relationship between the reeording and synchronizing beams. In the PLL circuit 39 of FIG. 24, it takes a time (pull-in time) to start generating, in a settled state, the image clock signal in synchronism with the synchronizing clock signal Ps after the synchronizing clock signal Ps is applied to the phase comparator 61. The above-mentioned pull-in time is illustrated, as a time $t_1$, in FIG. 50(B). On the other hand, as shown in FIG. 50(A), the synchronizing clock signal Ps is supplied to the phase comparator 61 for every scan. Therefore, the image clock signal is in an unstable state during the pull-in time after the start of each scan. As a result, the quality of recorded images written on the recording medium during the pull-in time may be deteriorated.

From this viewpoint, the improvement described below is designed so as not to record information during the pull-in time. For this purpose, as shown in FIG. 51, the improvement has an essential feature in which the grating scanning width G in the main scanning direction on a plane such as the recording medium 58 formed by the synchronizing beam P2 is made wider than the image recording width W in the main scanning direction on the same plane formed by the recording beam P1. Particularly, on the scan starting side, there is provided the difference between the grating scanning width G and the image recording width W. In other words, a deflection angle $\theta 2$ of the synchronizing beam P2 defined as an angle between the center of the image recording width W and the scan starting position of the synchronizing beam P1, is made larger than a deflection angle 81 of the recording beam P1 defined as an angle between the center of the image recording width W and the scan starting position of the synchronizing beam P2. Thereby, as shown in FIG. 50(C), it becomes possible to start recording information W after the image clock signal is stabilized and to record information W on the recording medium 52 during a time $t_2$ (FIG. 50(B)) when the image clock signal is kept in the settled state.

Figure 52:
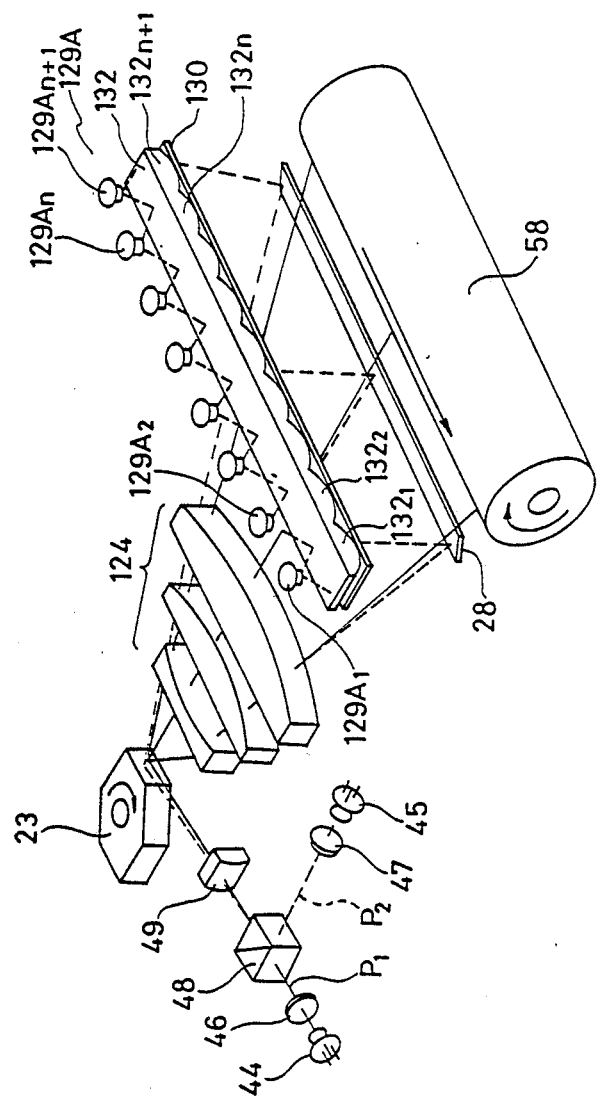
FIG. 52 is a perspective view of essential parts of the still further embodiment.

FIG. 52 is a perspective view of an embodiment based on the above-mentioned improvement. In FIG. 52, those parts which are the same as those in FIG. 24, are given the same reference numerals. A lens array 132 comprises cylindrical lenses $132_1, 132_2, \ldots, 132_n$, and $132_{n+1}$, which are arranged side by side in a line. The lens array 132 corresponds to a lens array obtained b adding the cylindrical lens $132_{n+1}$ to the lens array 32A shown in FIG. 12. Of course, actually, the lens array 132 is integrally formed. A light receiving system 129A comprises light receiving elements $129_1, 129_2, \ldots, 129_n$ and $129_{n+1}$. The light receiving system 129A corresponds to a light receiving system obtained by adding the light receiving element $129_{n+1}$ to the light receiving system 29A shown in FIG. 12. A grating 130 has an increased number of minute dark portions and minute bright portions, compared with the grating 30. This depends on the increase f the deflection angle $\theta 2$ of the synchronizing beam P2. An f$\theta$lens 124 is designed so as to effectively operate on the recording beam P1 as well as the synchronizing beam P2.

In operation, the synchronizing beam P2 emitted from the laser diode 45 is reflected onto the polygonal mirror 23, and passes through the f$\theta$-lens 124. Then, the synchronizing beam P2 is reflected onto the mirror 28, and enters, through the grating 130, the lens array 132 from the cylindrical lens $132_{n+1}$. Then, the synchronizing beam P2 is converged by the lens array 132, and sequentially enters the light receiving system 129A. The image clock signal starts being generated when the synchronizing clock signal Ps is supplied from the light receiving element $129A_{n+1}$ to the PLL circuit 39. During the pull-in time $t_1$, the image clock signal is in the unstable state. After the pull-in time $t_1$ passes, the synchronizing clock signal is kept in the stabilized state as shown in FIG. 50(B). On the other hand, the recording beam P1 emitted from the laser diode 44 reaches the recording drum 58. When the recording beam P1 scanning the recording drum 58, the image clock signal has already been stabilized. As a result, it becomes possible to record information on the recording medium 58 in the stable state, i.e., during the time $t_2$ shown in FIG. 50(B).

The above-mentioned improvement can be applied to not only the structure of FIG. 12 but also the aforementioned embodiments. For example, it is possible to replace the lens array 132 with other lens arrays such as the mirror array described previously.

Further, the present invention is not limited to these embodiments, but various variations and modifications may be made without departing from the scope of the present invention.

What is claimed is:

1. A synchronizing signal generating system for a laser scanner, said synchronizing signal generating system comprising:

first means for emitting a first laser beam for recording information on a medium and for emitting a second laser beam for synchronization of a scan by said first laser beam;

second means for scanning said medium by said first laser beam;

third means for scanning a grating by said second laser beam, said grating having bright portions and dark portions alternately arranged along a scanning direction of said second laser beam;

a converging optical system including a plurality of light converging elements aligned so as to cover a width of scan by said second laser beam measured on said grating, wherein the first width of scan, by said second laser beam is larger than the width of scan, by said first laser beam, when measured on the same plane, said plurality of light converging elements converging said second laser beam transmitted through said grating;

a light receiving system for receiving said second laser beam converged by said converting optical system and for generating a synchronizing signal; and fourth means for controlling said first means responsive to said synchronizing signal so as to synchronize a scan timing of said first laser beam.

2. A synchronizing signal generating system as claimed in claim 1, wherein said second means cans said medium by said first laser beam with a first scanning angle, and said third means scans said grating by said second laser beam with a second scanning angle larger than said first angle.

3. A synchronizing signal generating system as claimed in claim 1, wherein said first means emits said second laser beam, and emits said first laser beam when a predetermined time passes after emitting said second laser beam.

4. A synchronizing signal generating system as claimed in claim 1, wherein said fourth means comprises:

a phase locked loop means for generating an image clock signal responsive to said synchronizing signal, said image clock signal having a frequency higher than that of said synchronizing signal, and driving means for driving said first means in synchronism with said image clock signal depending on input information data and for starting to drive said first means after said image clock signal generated by said phase locked loop means is pulled in synchronism with said synchronizing signal and is stabilized.

5. A synchronizing signal generating means as claimed in claim 1, wherein said converging optical system comprises:

a mirror array made up of a plurality of concave mirrors serving as said plurality of light converging elements, said mirror array being provided for said width of scan by said second laser beam measured on said grating, a ratio Pm/Pg between a pitch Pm of said concave mirrors and a pitch Pg of the bright and dark portions of said grating being set to an integer, so that said second laser beam transmitted through said grating is prevented from scanning a junction portion between two mutually adjacent concave mirrors of said mirror array.

6. A synchronizing signal generating means as claimed in claim 1, wherein said converging optical system comprises:

a mirror array made up of a plurality of concave mirrors serving as said plurality of light converging elements, said mirror array being provided for said width of scan by said second laser beam measured on said grating, a ratio Pm/Pg between a pitch Pm of said concave mirrors and a pitch of the bright and dark portion of said grating being slightly grater than an integer, so that said second laser beam transmitted through said grating is prevented from scanning a junction portion between two mutually adjacent concave mirrors of said mirror array.

* * * * *